(12) United States Patent
Koudo et al.

(10) Patent No.: US 10,930,230 B2
(45) Date of Patent: Feb. 23, 2021

(54) DISPLAY DEVICE

(71) Applicants: Panasonic Liquid Crystal Display Co., Ltd., Himeji (JP); Pasona Knowledge Partner Inc., Osaka (JP)

(72) Inventors: Toshikazu Koudo, Hyogo (JP); Tetsuo Fukami, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/244,975

(22) Filed: Jan. 10, 2019

(65) Prior Publication Data

US 2019/0147812 A1 May 16, 2019

Related U.S. Application Data

(63) Continuation of application No. PCT/JP2016/003331, filed on Jul. 14, 2016.

(51) Int. Cl.
| | |
|---|---|
| *G09G 3/36* | (2006.01) |
| *G02F 1/1368* | (2006.01) |
| *G02F 1/1347* | (2006.01) |
| *G02F 1/1335* | (2006.01) |
| *G02F 1/133* | (2006.01) |

(Continued)

(52) U.S. Cl.
CPC ......... *G09G 3/3607* (2013.01); *G02F 1/1347* (2013.01); *G02F 1/1368* (2013.01); *G02F 1/13306* (2013.01); *G02F 1/13471* (2013.01); *G02F 1/133512* (2013.01); *G02F 1/136209* (2013.01); *G02F 1/136286* (2013.01); *G09G 3/3688* (2013.01); *G02F 2001/133388* (2013.01); *G02F 2001/136222* (2013.01); *G09G 2300/0426* (2013.01);

(Continued)

(58) Field of Classification Search
CPC ................................................. G09G 2300/023
See application file for complete search history.

(56) References Cited

U.S. PATENT DOCUMENTS

| | | | |
|---|---|---|---|
| 2014/0035942 A1* | 2/2014 | Yun | G09G 5/006 345/592 |
| 2015/0035738 A1* | 2/2015 | Hirota | G09G 3/3607 345/88 |

(Continued)

FOREIGN PATENT DOCUMENTS

| | | |
|---|---|---|
| CN | 105242439 | 1/2016 |
| JP | 53-127550 U | 10/1978 |

(Continued)

OTHER PUBLICATIONS

International Search Report issued in International Application No. PCT/JP2016/003331, dated Aug. 16, 2016, 4 pages.

(Continued)

*Primary Examiner* — Hang Lin
(74) *Attorney, Agent, or Firm* — Hamre, Schumann, Mueller & Larson, P.C.

(57) ABSTRACT

A display device includes a first display panel disposed closer to an observer and a second display panel disposed farther from the observer than the first display panel. An image display region of the second display panel is larger than an image display region of the first display panel.

14 Claims, 20 Drawing Sheets

(51) Int. Cl.
   *G02F 1/1362*   (2006.01)
   *G02F 1/1333*   (2006.01)
(52) U.S. Cl.
   CPC . *G09G 2300/0452* (2013.01); *G09G 2310/08* (2013.01); *G09G 2370/20* (2013.01)

(56) References Cited

U.S. PATENT DOCUMENTS

| | | | | |
|---|---|---|---|---|
| 2015/0082058 | A1* | 3/2015 | Hahm | G06F 3/1454 |
| | | | | 713/320 |
| 2016/0180789 | A1* | 6/2016 | Hur | G09G 3/3614 |
| | | | | 345/100 |
| 2017/0278903 | A1 | 9/2017 | Zhou et al. | |
| 2017/0347474 | A1* | 11/2017 | Alonso | B32B 3/08 |
| 2018/0024798 | A1* | 1/2018 | Zou | G06F 3/14 |
| | | | | 715/864 |

FOREIGN PATENT DOCUMENTS

| | | |
|---|---|---|
| JP | 2007-310161 | 11/2007 |
| JP | 2008-191269 | 8/2008 |
| JP | 2012-132975 | 7/2012 |
| JP | 2013-054162 | 3/2013 |

OTHER PUBLICATIONS

Office Action issued for the corresponding Chinese Application No. 201680087698.2, dated Jun. 3, 2020, 13 pages including English translation of the Search Report.

\* cited by examiner

EXPANSION
(FIG8,FIG9)

110a
210a

B — B'

PERIPHERAL AREA — DISPLAY SURFACE — PERIPHERAL AREA
110a
B — B' — 100
— 200
— 400
210a

DISPLAY DEVICE

CROSS-REFERENCE TO RELATED APPLICATION

This application is a bypass continuation of international patent application PCT/JP2016/003331, filed: Jul. 14, 2016 designating the United States of America, the entire disclosure of which is incorporated herein by reference.

TECHNICAL FIELD

The present disclosure relates to a display device.

BACKGROUND

A technology, in which two display panels overlap each other and an image is displayed on each display panel based on an input video signal, is conventionally proposed to improve contrast of a liquid crystal display device (for example, see Japanese published document 2007-310161). Specifically, for example, a color image is displayed on a front-side (observer-side) display panel in two display panels disposed back and forth, and a monochrome image is displayed on a rear-side (backlight-side) display panel, thereby improving contrast.

SUMMARY

However, in the conventional liquid crystal display device, for example, in the case that an end of the display screen is viewed from an oblique direction in two display panels disposed at front and rear sides, a problem that the end of the display image is not normally displayed arises due to an influence of a non-display region of the display panel disposed on the rear side. Specifically, an end of the display image becomes dark, and the end of the original display image is seen while lacked.

The present invention prevents a display abnormality at an end of a display image in a liquid crystal display device in which a plurality of display panels overlap each other.

To solve the above problem, a display device according to a present disclosure in which a plurality of display panels are disposed while overlapping each other, an image is displayed on each of the display panels, includes a first display panel disposed closer to an observer and a second display panel disposed farther from the observer than the first display panel. An image display region of the second display panel is larger than an image display region of the first display panel.

In the liquid crystal display device according to the present disclosure, an outer periphery of the image display region of the second display panel may be located outside an outer periphery of the image display region of the first display panel in planar view.

In the display device according to the present disclosure, the image display region of each of the plurality of display panels may become larger as a position at which the display panel is disposed is farther from the observer.

In the display device according to the present disclosure, the image display region of the second display panel may include an opposed display region facing the image display region of the first display panel in planar view and an extended display region around the opposed display region, and the second display panel may display an image identical to an image displayed at an end of the opposed display region in the extended display region.

In the display device according to the present disclosure, a width of the extended display region may be set based on a distance from a surface on an observer side in a glass substrate constituting the first display panel on a second display panel side to a surface on an opposite side to the observer side in a glass substrate constituting the second display panel on a first display panel side and a refractive index of each of the glass substrates.

In the display device according to the present disclosure, assuming that t1 is a width of the extended display region, that n1 is a refractive index of a glass substrate constituting the first display panel on a second display panel side, that n2 is a refractive index of a glass substrate constituting the second display panel on a first display panel side, and that d is a distance from a surface on an observer side in the glass substrate constituting the first display panel on the second display panel side to a surface on an opposite side to the observer side in the glass substrate constituting the second display panel on the first display panel side, $$t1 \geq d \times \frac{\sqrt{3}}{\sqrt{4n^2 - 3}}$$

May be satisfied, where n=(n1+n2)/2.

The display device according to the present disclosure may further include an image processor that generates first image data for displaying a color image in the image display region of the first display panel and second image data for displaying a black-and-white image in the image display region of the second display panel based on an input video signal.

In the display device according to the present disclosure, the image display region of the second display panel may include an opposed display region facing the image display region of the first display panel in planar view and an extended display region around the opposed display region, and the image processor may generate the second image data by generating image data for the opposed display region based on the input video signal and generating image data for the extended display region based on the image data for the opposed display region.

In the display device according to the present disclosure, the image display region of the second display panel may include an opposed display region facing the image display region of the first display panel in planar view and an extended display region around the opposed display region, a plurality of signal lines to which a signal for image display is supplied from a drive circuit may be arranged in the image display region of the second display panel, and a plurality of the signal lines may be electrically connected to a first output terminal of the drive circuit in the extended display region.

In the display device according to the present disclosure, a plurality of another signal lines may be electrically connected to a second output terminal of the drive circuit in the extended display region, the first output terminal may be closer to the opposed display region than the second output terminal, and a number of signal lines electrically connected to the first output terminal may be smaller than a number of signal lines electrically connected to the second output terminal.

In the display device according to the present disclosure, in the extended display region, the signal for the image display may be simultaneously supplied to the plurality of signal lines electrically connected to the first output terminal.

In the display device according to the present disclosure, a plurality of pixels arranged in the extended display region may overlap a black matrix formed around the image display region of the first display panel in planar view.

In the display device according to the present disclosure, the image display region of the second display panel may include an opposed display region facing the image display region of the first display panel in planar view and an extended display region around the opposed display region, and a part of the plurality of pixels arranged in the extended display region may be larger than a pixel arranged in the opposed display region.

EMBODIMENT

Hereinafter, exemplary embodiments of the present disclosure will be described with reference to the drawings. A display device according to the present disclosure is not limited to a liquid crystal display device, but may be an organic electro luminescence display.

A liquid crystal display device according to an exemplary embodiment includes a plurality of display panels that display images, a plurality of drive circuits (a plurality of source drivers and a plurality of gate drivers) that drive the display panels, a plurality of timing controllers that control the drive circuits, an image processor that performs image processing on an input video signal input from an outside and outputs image data to each of the timing controllers, and a backlight that irradiates the plurality of display panels with light from a back surface side. There is no limitation to a number of display panels, but it is only necessary to provide at least two display panels. When viewed from the observer side, the plurality of display panels are disposed while superimposed on each other in a front-back direction. An image is displayed on each of the display panels. Liquid crystal display device 10 including two display panels will be described below by way of example.

Figure 1:
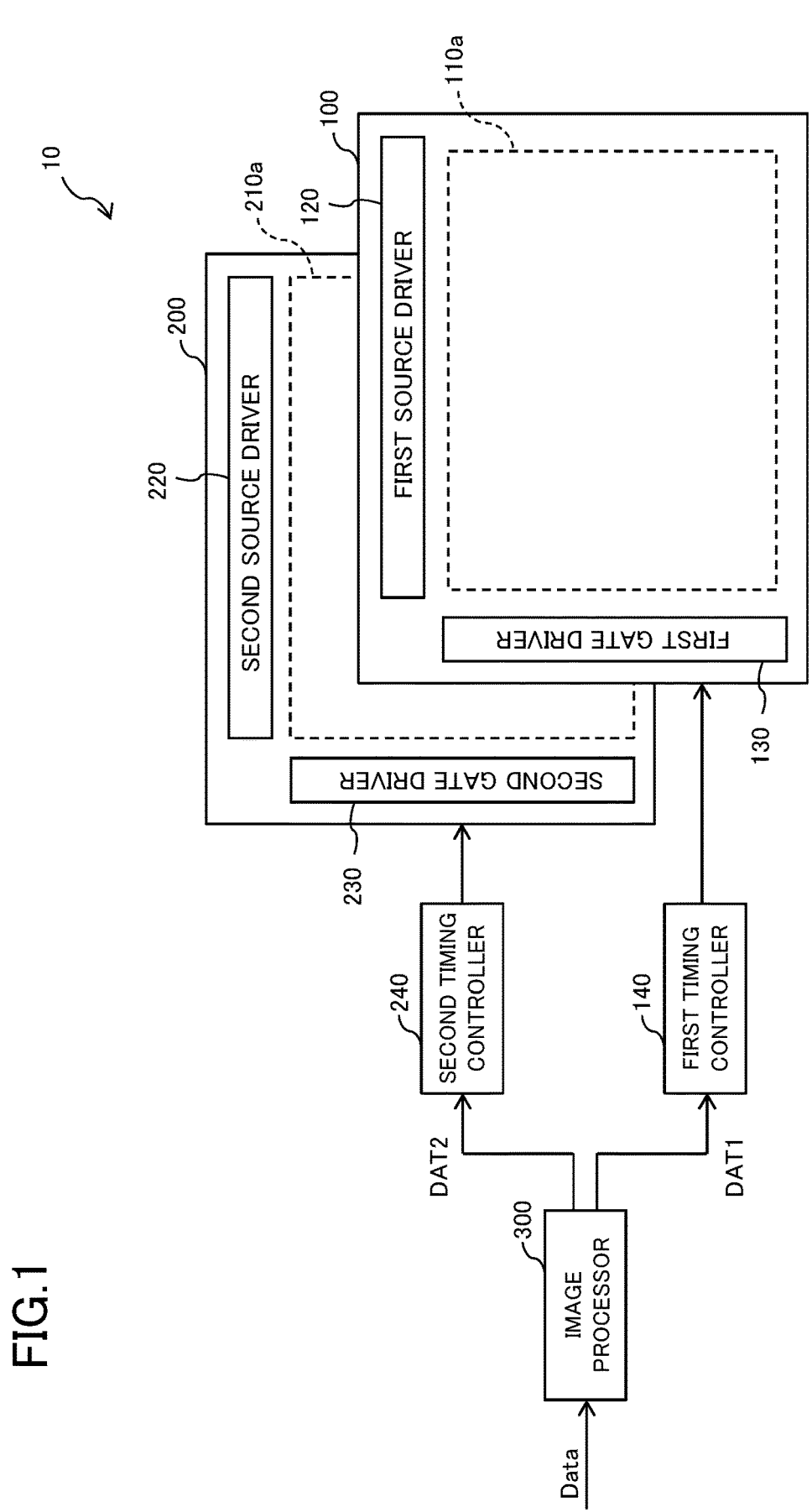
FIG. 1 is a plan view illustrating a schematic configuration of a liquid crystal display device according to an exemplary embodiment.

FIG. 1 is a plan view illustrating a schematic configuration of liquid crystal display device 10 of the exemplary embodiment. As illustrated in FIG. 1, liquid crystal display device 10 includes first display panel 100 disposed closer to an observer (front side), second display panel 200 disposed farther away from the observer (rear side) than first display panel 100, first timing controller 140 that controls first source drivers 120 and first gate drivers 130, first source drivers 120 and first gate drivers 130 being provided in first display panel 100, second timing controller 240 that controls second source drivers 220 and second gate drivers 230, second source drivers 220 and second gate drivers 230 being provided in second display panel 200, and image processor 300 that outputs image data to first timing controller 140 and second timing controller 240. First display panel 100 displays a color image according to the input video signal, and second display panel 200 displays a black-and-white image (monochrome image) according to the input video signal. Image processor 300 receives input video signal Data transmitted from an external system (not illustrated), performs image processing (to be described later) on input video signal Data, outputs first image data DAT1 to first timing controller 140, and outputs second image data DAT2 to second timing controller 240. Image processor 300 also outputs a control signal (not illustrated in FIG. 1) such as a synchronizing signal to first timing controller 140 and second timing controller 240. First image data DAT1 is image data used to display the color image, and second image data DAT2 is image data used to display the black-and-white image. The backlight (not illustrated in FIG. 1) is disposed on the back surface side of second display panel 200. A specific configuration of image processor 300 will be described later.

Figure 2:
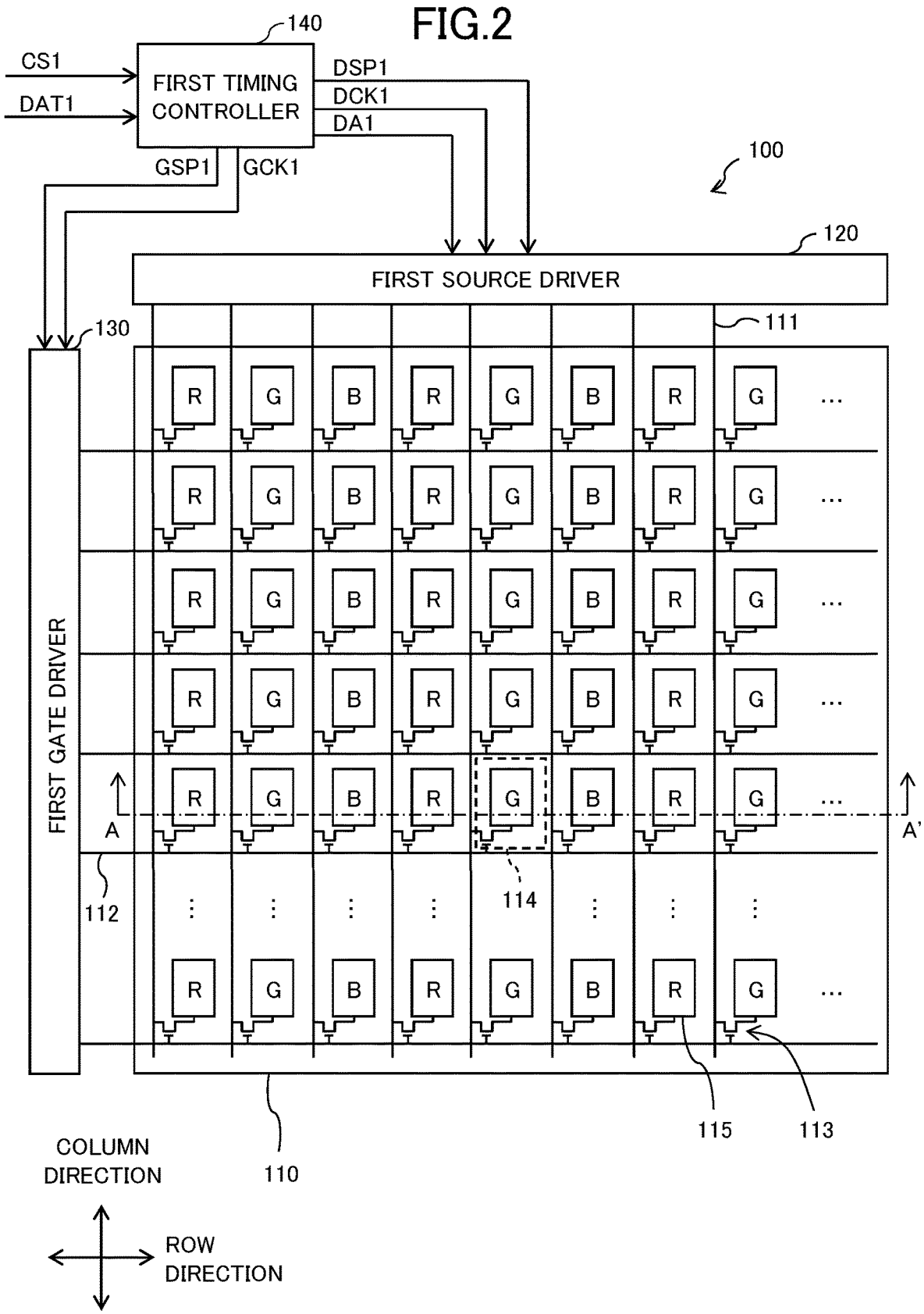
FIG. 2 is a plan view illustrating a schematic configuration of a first display panel of the exemplary embodiment.
Figure 3:
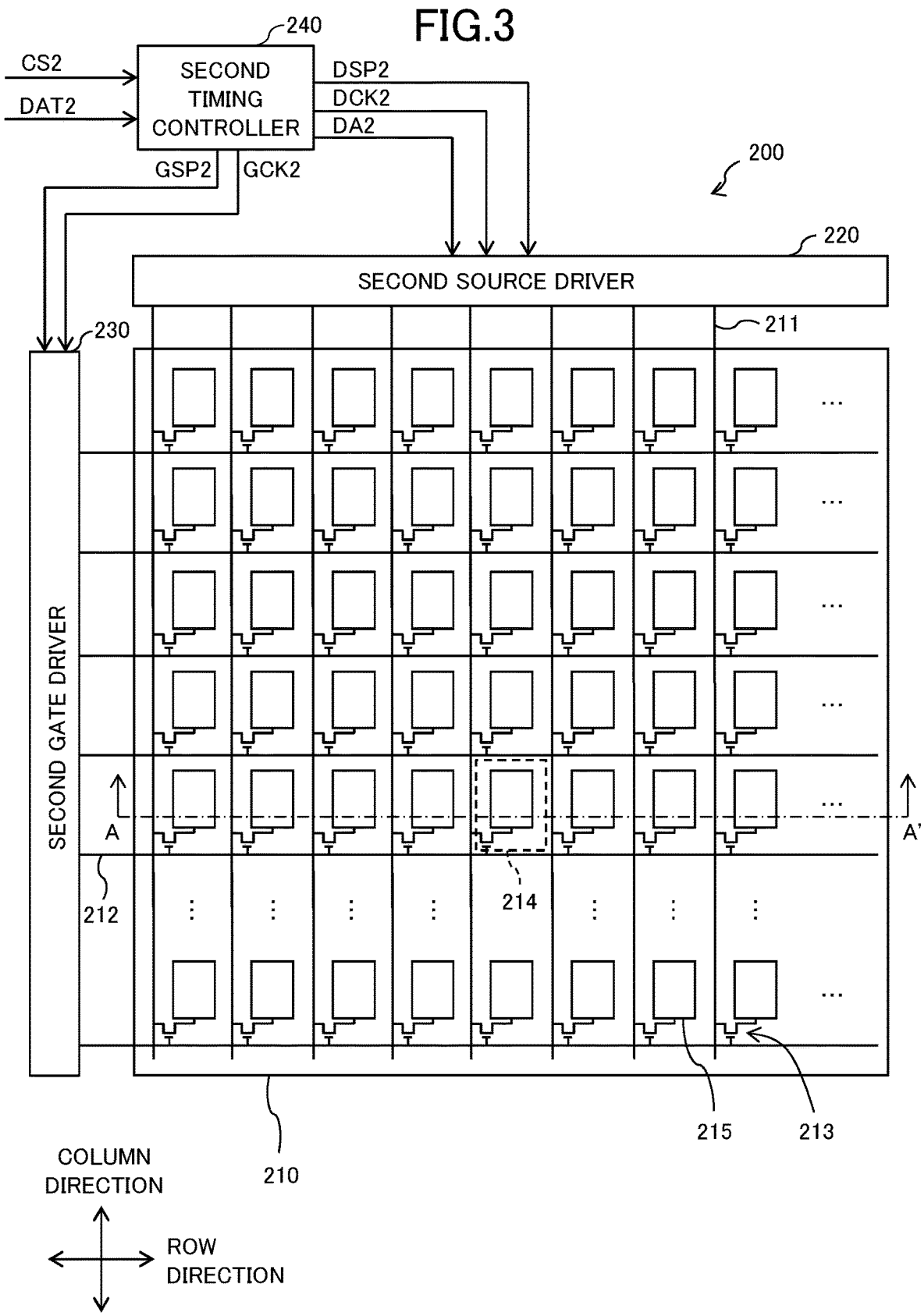
FIG. 3 is a plan view illustrating a schematic configuration of a second display panel of the exemplary embodiment.
Figure 4:
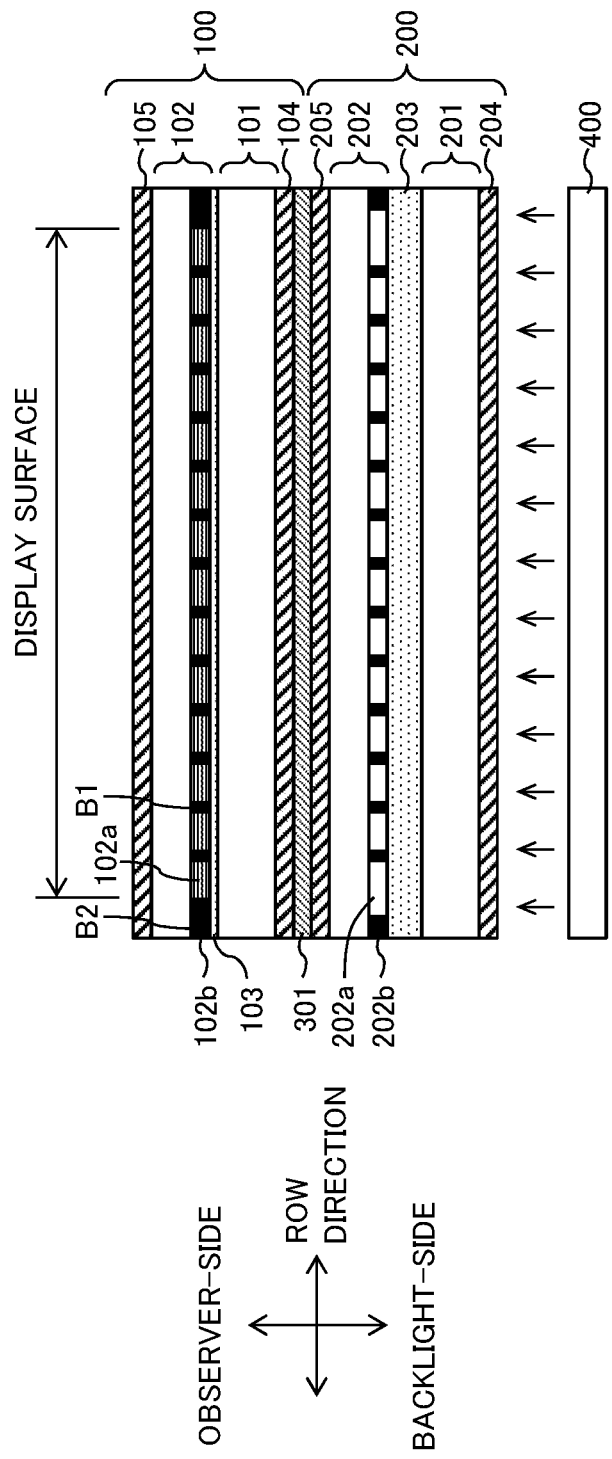
FIG. 4 is a sectional view taken along line A-A in FIGS. 2 and 3.

FIG. 2 is a plan view illustrating a schematic configuration of first display panel 100, and FIG. 3 is a plan view illustrating a schematic configuration of second display panel 200. FIG. 4 is a sectional view taken along line A-A in FIGS. 2 and 3;

A configuration of first display panel 100 will be described with reference to FIGS. 2 and 4. As illustrated in FIG. 4, first display panel 100 includes thin film transistor substrate 101 (hereinafter, referred to as a TFT substrate) disposed on the side of backlight 400, color filter substrate 102 (hereinafter, referred to as a CF substrate), which is disposed on the observer side while being opposite to TFT substrate 101, and liquid crystal layer 103 disposed between TFT substrate 101 and CF substrate 102. Polarizing plate 104 is disposed on the side of backlight 400 of first display panel 100, and polarizing plate 105 is disposed on the observer side.

In TFT substrate 101, as illustrated in FIG. 2, a plurality of data lines 111 extending in a first direction (for example, a column direction) and a plurality of gate lines 112 extending in a second direction (for example, a row direction) different from the first direction are formed, and thin film transistors 113 (hereinafter, referred to as a TFT) are formed near an intersection between each of the plurality of data lines 111 and each of the plurality of gate lines 112, respectively. In planar view of first display panel 100, a region surrounded by two data lines 111 adjacent to each other and two gate lines 112 adjacent to each other is defined as one pixel 114, and a plurality of pixels 114 are disposed in a matrix form (the row direction and the column direction). The plurality of data lines 111 are disposed at equal intervals in the row direction, and the plurality of gate lines 112 are disposed at equal intervals in the column direction. In TFT substrate 101, pixel electrode 115 is formed in each pixel 114, and one common electrode (not illustrated) common to the plurality of pixels 114 is formed. A drain electrode constituting TFT 113 is electrically connected to data line 111, a source electrode constituting TFT 113 is electrically connected to pixel electrode 115, and a gate electrode constituting TFT 113 is electrically connected to gate line 112.

As illustrated in FIG. 4, a plurality of colored portions 102a each of which corresponds to pixel 114 are formed on CF substrate 102. Each colored portion 102a is surrounded by black matrix 102b blocking light transmission. For example, each colored portion 102a is formed into a rectangular shape. The plurality of colored portions 102a include red portions made of a red (R color) material to transmit red light, green portions made of a green (G color) material to transmit green light, and blue portions made of a blue (B color) material to transmit blue light. The red portion, the green portion, and the blue portion are repeatedly arranged in this order in the row direction, the colored portions having the same color are arranged in the column direction, and black matrix 102b is formed at a boundary portion between colored portions 102a adjacent in the row and column directions. According to colored portions 102a, the plurality of pixels 114 include red pixels 114R corresponding to the red portions, green pixels 114G corresponding to the green portions, and blue pixels 114B corresponding to the blue portions as illustrated in FIG. 2.

Black matrix 102b includes a plurality of first light shielding stripes B1 (see FIG. 4) arranged at each boundary portion between two colored portions 102a adjacent to each other in the row direction and a plurality of second light shielding stripes (not illustrated) arranged at each boundary portion between two colored portions 102a adjacent to each other in the column direction. The plurality of first light shielding stripes B1 and the plurality of second light shielding stripes are arranged in first image display region 110a (to be described later). Black matrix 102b further includes light shielding frame B2 (see FIG. 4) disposed in first non-display region 110b. Light shielding frame B2 surrounds the periphery of the plurality of first light shielding stripes B1 and the plurality of second light shielding stripes, and is connected to ends of each first light shielding stripe B1 and each second light shielding stripe.

First timing controller 140 has a known configuration. For example, based on first image data DAT1 and first control signal CS1 (such as a clock signal, a vertical synchronizing signal, and a horizontal synchronizing signal), which are output from image processor 300, first timing controller 140 generates various timing signals (data start pulse DSP1, data clock DCK1, gate start pulse GSP1, and gate clock GCK1) in order to control first image data DA1 and drive of first source driver 120 and first gate driver 130 (see FIG. 2). First timing controller 140 outputs first image data DA1, data start pulse DSP1, and data clock DCK1 to first source driver 120, and outputs gate start pulse GSP1 and gate clock GCK1 to first gate driver 130.

First source driver 120 outputs a data signal (data voltage) corresponding to first image data DA1 to data lines 111 based on data start pulse DSP1 and data clock DCK1. First gate driver 130 outputs a gate signal (gate voltage) to gate lines 112 based on gate start pulse GSP1 and gate clock GCK1.

The data voltage is supplied from first source driver 120 to each data line 111, and the gate voltage is supplied from first gate driver 130 to each gate line 112. Common voltage Vcom is supplied from a common driver (not illustrated) to the common electrode. When the gate voltage (gate-on voltage) is supplied to gate line 112, TFT 113 connected to gate line 112 is turned on, and the data voltage is supplied to pixel electrode 115 through data line 111 connected to TFT 113. An electric field is generated by a difference between the data voltage supplied to pixel electrode 115 and common voltage Vcom supplied to the common electrode. The liquid crystal is driven by the electric field to control a transmittance of light from backlight 400 through second display panel 200, thereby displaying the image. In first display panel 100, the color image is displayed by supplying the desired data voltage to data line 111 connected to pixel electrode 115 of each of red pixel 114R, green pixel 114G, and blue pixel 114B. A known configuration can be applied to first display panel 100.

A configuration of second display panel 200 will be described below with reference to FIGS. 3 and 4. As illustrated in FIG. 4, second display panel 200 includes TFT substrate 201 disposed on the side of backlight 400, CF substrate 202 that is disposed on the observer side while opposed to TFT substrate 201, and liquid crystal layer 203 disposed between TFT substrate 201 and CF substrate 202. Polarizing plate 204 is disposed on the side of backlight 400 of second display panel 200, and polarizing plate 205 is disposed on the observer side. Diffusion sheet 301 is disposed between polarizing plate 104 of first display panel 100 and polarizing plate 205 of second display panel 200.

In TFT substrate 201, as illustrated in FIG. 3, a plurality of data lines 211 extending in the column direction, a plurality of gate lines 212 extending in the row direction are formed, and TFTs 213 are formed near an intersection between each of the plurality of data lines 211 and each of the plurality of gate lines 212, respectively. In planar view of second display panel 200, a region surrounded by two data lines 211 adjacent to each other and two gate lines 212 adjacent to each other is defined as one pixel 214, and a plurality of pixels 214 are arranged in a matrix form (the row direction and the column direction). The plurality of data lines 211 are disposed at equal intervals in the row direction, and the plurality of gate lines 212 are disposed at equal intervals in the column direction. In TFT substrate 201, pixel electrode 215 is formed in each pixel 214, and one common electrode (not illustrated) common to the plurality of pixels 214 is formed. A drain electrode constituting TFT 213 is electrically connected to data line 211, a source electrode is electrically connected to pixel electrode 215, and a gate electrode is electrically connected to gate line 212.

As illustrated in FIG. 4, in CF substrate 202, black matrix 202b blocking light transmission is formed at a position corresponding to a boundary portion of each pixel 214. The colored portion is not formed in region 202a surrounded by black matrix 202b. For example, an overcoat film is formed in region 202a.

Based on second image data DAT2 and second control signal CS2 (such as a clock signal, a vertical synchronizing signal, and a horizontal synchronizing signal), which are output from image processor 300, second timing controller 240 generates various timing signals (data start pulse DSP2, data clock DCK2, gate start pulse GSP2, and gate clock GCK2) in order to control second image data DA2 and drive of second source driver 220 and second gate driver 230 (see FIG. 3). Second timing controller 240 outputs second image data DA2, data start pulse DSP2, and data clock DCK2 to second source driver 220, and outputs gate start pulse GSP2 and gate clock GCK2 to second gate driver 230.

Second source driver 220 outputs the data voltage corresponding to second image data DA2 to data lines 211 based on data start pulse DSP2 and data clock DCK2. Second gate driver 230 outputs the gate voltage to gate lines 212 based on gate start pulse GSP2 and gate clock GCK2.

The data voltage is supplied from second source driver 220 to each data line 211, and the gate voltage is supplied from second gate driver 230 to each gate line 212. Common voltage Vcom is supplied from the common driver to the common electrode. When the gate voltage (gate-on voltage) is supplied to gate line 212, TFT 213 connected to gate line 212 is turned on, and the data voltage is supplied to pixel electrode 215 through data line 211 connected to TFT 213. The electric field is generated by a difference between the data voltage supplied to pixel electrode 215 and common voltage Vcom supplied to the common electrode. The liquid crystal is driven by the electric field to control the transmittance of light from backlight 400, thereby displaying the image. The black-and-white image is displayed on second display panel 200.

Figure 5:
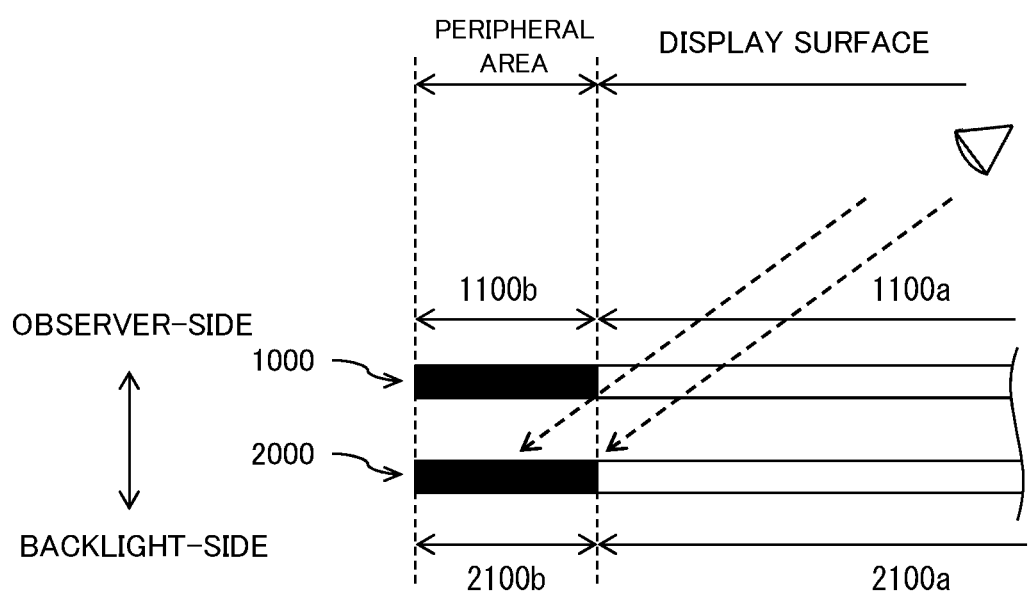
FIG. 5 is a sectional view schematically illustrating a conventional liquid crystal display device.

At this point, as described above, the problem that the end of the display image becomes dark arises in the conventional liquid crystal display device configured by superimposing the plurality of display panels. FIG. 5 is a sectional view schematically illustrating the conventional liquid crystal display device. In the conventional liquid crystal display device, image display region 1100a of display panel 1000 on the observer side and image display region 2100a of display panel 2000 on the backlight side have the same size, and the positions of the ends are matched with each other in planar view. In the configuration of FIG. 5, image display region 1100a constitutes the display screen of the liquid crystal display device, and non-display region 1100b around image display region 1100a constitutes a frame portion of the liquid crystal display device. In the configuration of FIG. 5, when the end of the display screen is viewed from an oblique direction (a dotted-line arrow in FIG. 5), a part of non-display region 2100b of backlight-side display panel 2000 overlaps image display region 1100a of observer-side display panel 1000, the end of the original display image displayed on the display screen is seen while darkly lacked.

Figure 6A:
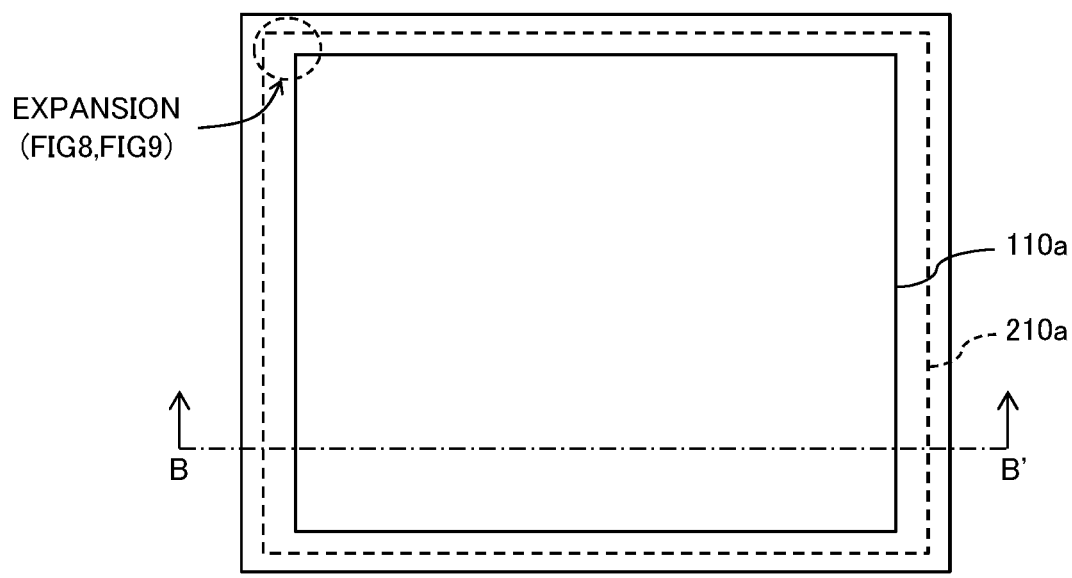
FIG. 6A is a plan view schematically illustrating a characteristic configuration of the liquid crystal display device of the exemplary embodiment.
Figure 6B:
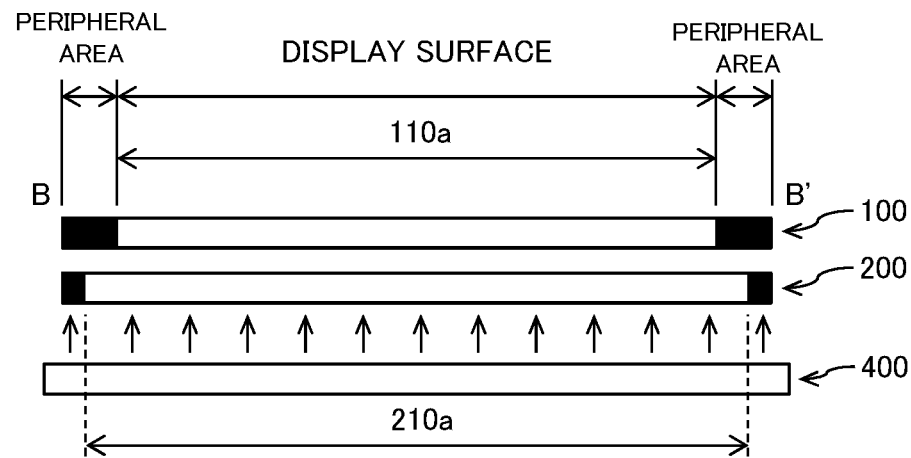
FIG. 6B is a sectional view taken along line B-B' in FIG. 6A.
Figure 7:
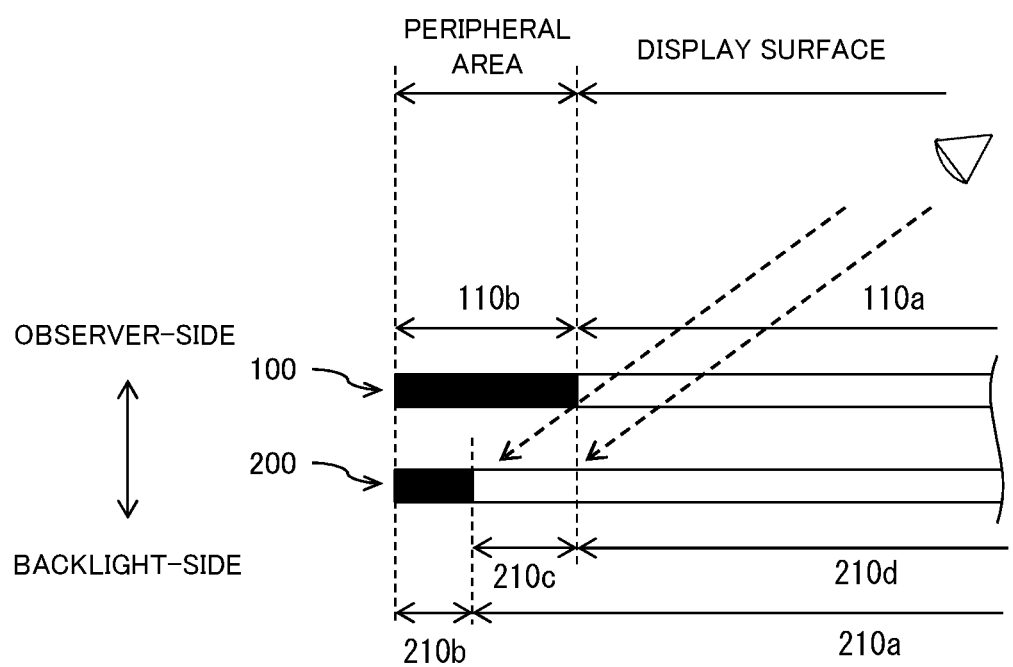
FIG. 7 is an enlarged view of a left end in FIG. 6B.

On the other hand, liquid crystal display device 10 of the exemplary embodiment has a configuration capable of visually recognizing the original image up to the end of the display image. FIG. 6A is a plan view schematically illustrating the configuration in liquid crystal display device 10, and FIG. 6B is a sectional view taken along line B-B' in FIG. 6A. In liquid crystal display device 10, second image display region 210a of backlight-side second display panel 200 is formed larger than first image display region 110a of observer-side first display panel 100, and first display panel 100 and second display panel 200 are disposed such that the end (outer periphery) of second image display region 210a surrounds first image display region 110a in planar view. Backlight 400 is configured such that a light emission surface is larger than first image display region 110a and second image display region 210a. In the configuration of FIGS. 6A and 6B, first image display region 110a constitutes the display screen of liquid crystal display device 10, and the region around first image display region 110a constitutes the frame portion of liquid crystal display device 10. FIG. 7 is an enlarged view of the left end in FIG. 6B. As illustrated in FIG. 7, second image display region 210a of second display panel 200 has a size in which first image display region 110a of first display panel 100 is enlarged. In second image display region 210a, a region extended with respect to first image display region 110a is defined as extended display region 210c. In liquid crystal display device 10, second non-display region 210b of second display panel 200 is formed smaller than first non-display region 110b of first display panel 100. According to the configuration of liquid crystal display device 10, when the end of the display screen is viewed from the oblique direction (a dotted-line arrow in FIG. 7), second non-display region 210b of second display panel 200 does not overlap first image display region 110a of first display panel 100, and the end of the display image can be prevented from becoming dark (see FIG. 5).

In liquid crystal display device 10, extended display region 210c (see FIG. 7) of second display panel 200 displays the same image as the image at the end of the region (hereinafter, referred to as opposed display region 210d) opposed to first image display region 110a in second image display region 210a such that the original display image can visually be recognized when the end of the display screen is viewed from the oblique direction. That is, opposed display region 210d is a region overlapping first image display region 110a in planar view. A specific configuration relating to extended display region 210c will be described below.

Figure 8:
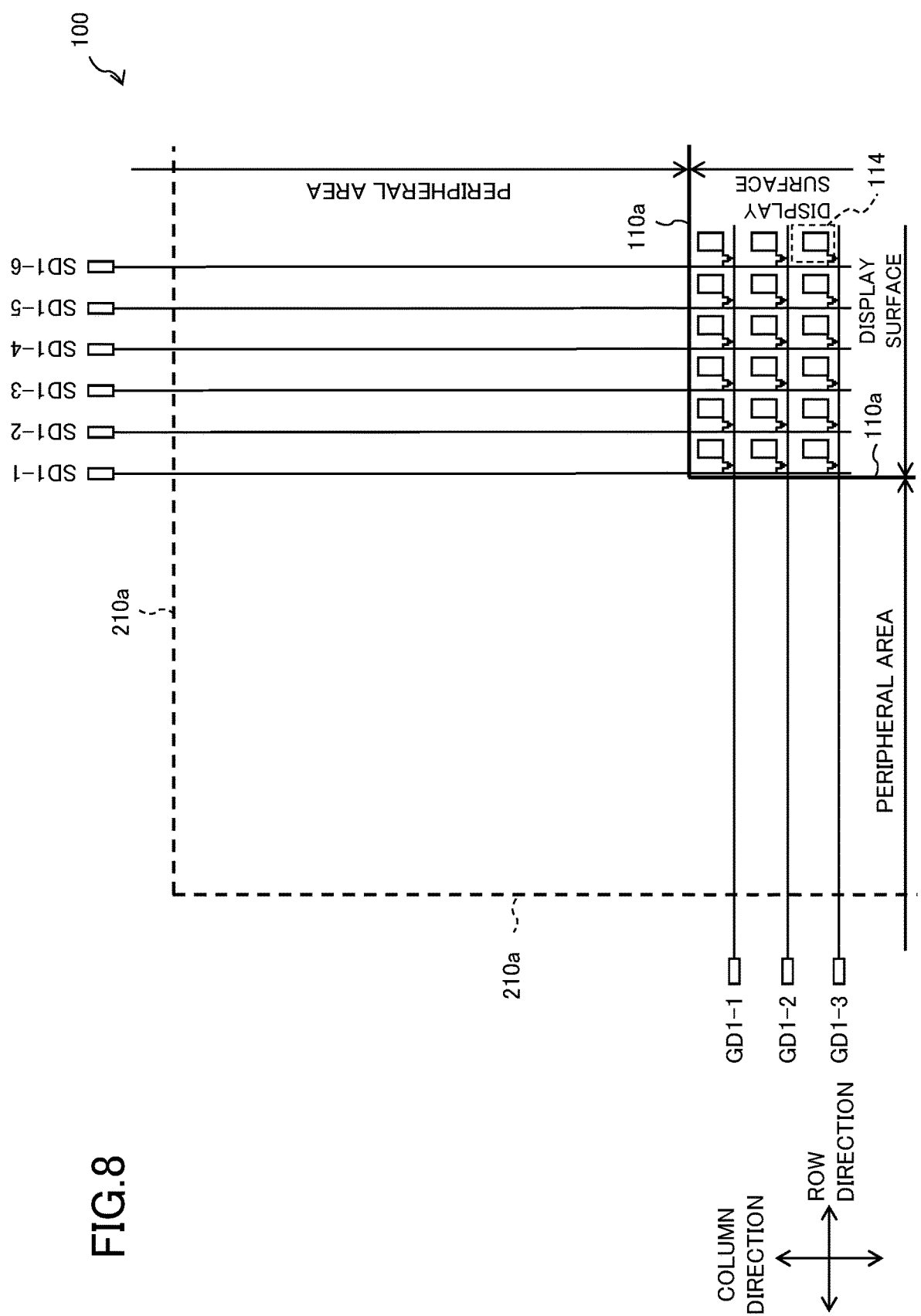
FIG. 8 is a plan view illustrating a part of a first image display region of the first display panel.
Figure 9:
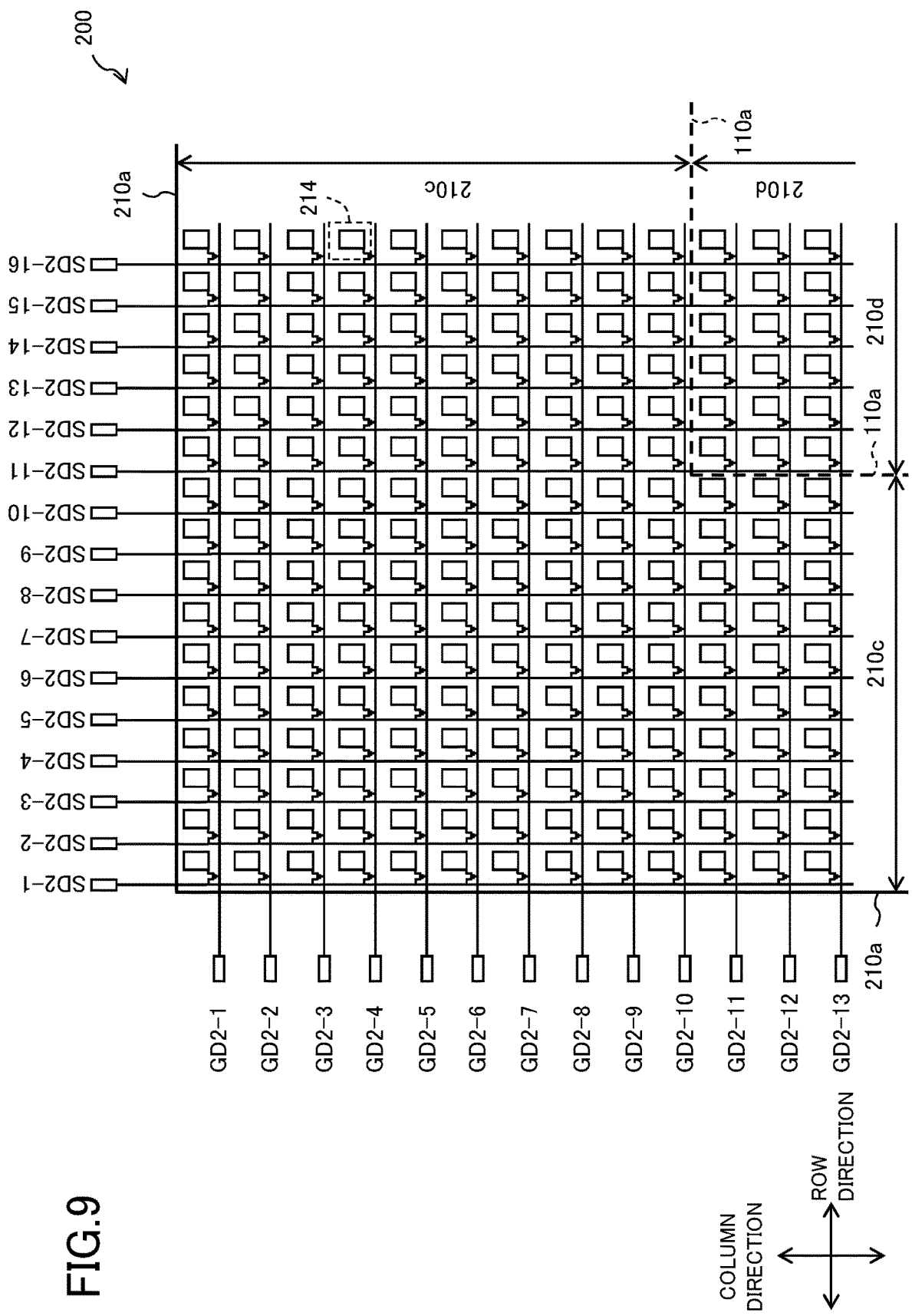
FIG. 9 is a plan view illustrating a part of a second image display region of the second display panel.

FIG. 8 is a plan view illustrating a part of first image display region 110a of first display panel 100. FIG. 9 is a plan view illustrating a part of second image display region 210a of second display panel 200. FIGS. 8 and 9 illustrate an enlarged configuration of an upper left portion (dotted-line circled portion) of second display panel 200 in FIG. 6A. In FIG. 8, "SD1-1" to "SD1-6" indicate first to sixth output terminals of first source driver 120, and "GD1-1" to "GD1-3" indicate first to third output terminals of first gate driver 130. In FIG. 9, "SD2-1" to "SD2-16" indicate first to sixteenth output terminals of second source driver 220, and "GD2-1" to "GD2-13" indicate first to thirteenth output terminals of second gate driver 230.

As illustrated in FIGS. 8 and 9, in first display panel 100, pixel 114 is not disposed in the region opposed to the frame portion, but black matrix 102b (see FIG. 4) is formed. On the other hand, in second display panel 200, a plurality of pixels 214 are arranged in the region (extended display region 210c) opposed to the frame portion. For this reason, the plurality of pixels 214 arranged in extended display region 210c are arranged so as to overlap black matrix 102b opposed to the frame portion in planar view. More particularly, the plurality of pixels 214 arranged in extended display region 210c are arranged so as to overlap light shielding frame B2 disposed in the frame portion of first display panel 100 in planar view. In the example of FIG. 9, ten pixels 214 are arranged in the row direction and the column direction respectively in the extended display region 210c so as to overlap black matrix 102b in planar view. In the case that first display panel 100 and second display panel 200 are superimposed such that the center positions in the row direction and the column direction are matched with each other in planar view, ten pixels 214 are arranged around first image display region 110a in the extended display region 210c.

Figure 10:
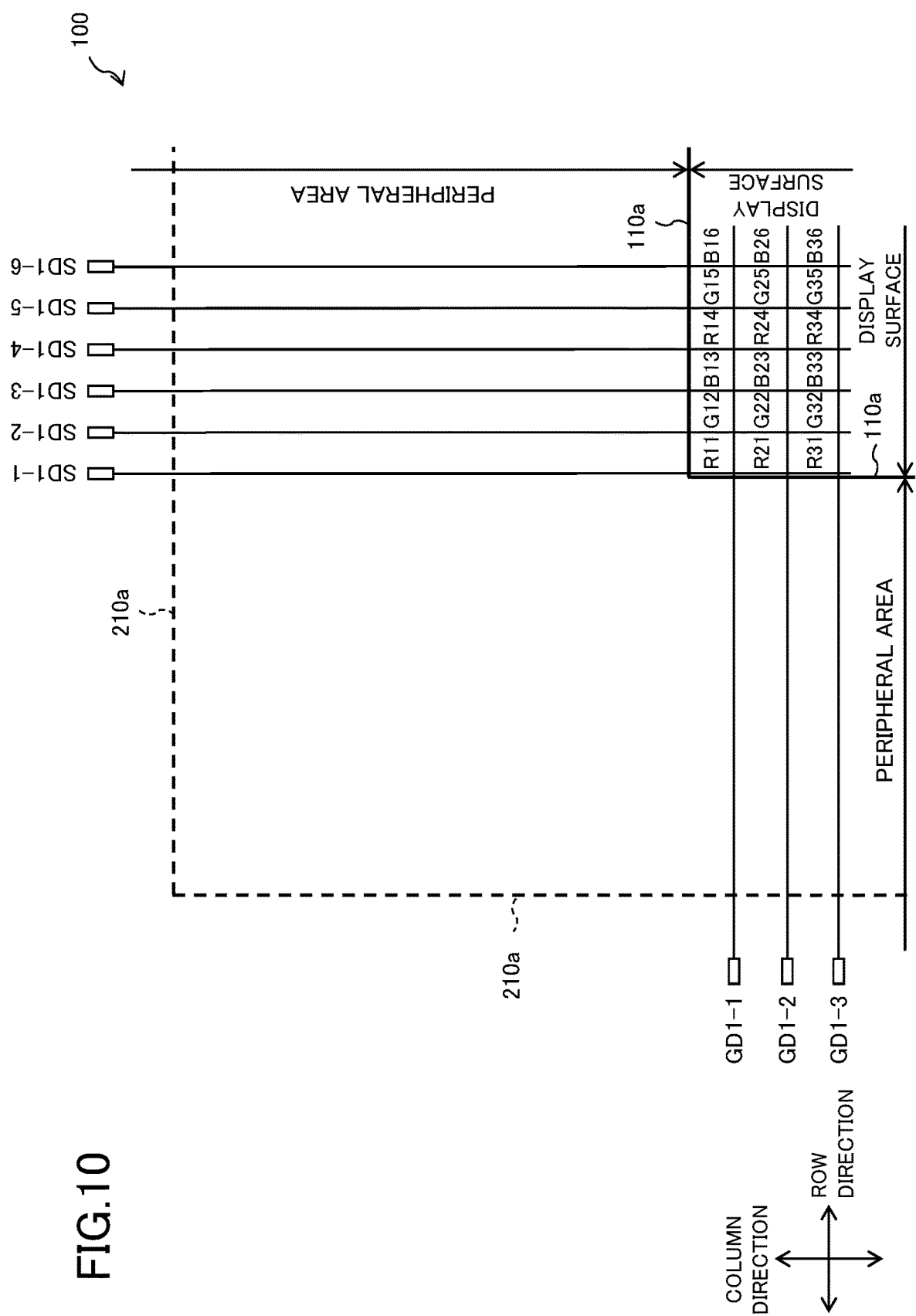
FIG. 10 is a view illustrating pixel information corresponding to each pixel of the first display panel in FIG. 8.

FIG. 10 is a view illustrating pixel information corresponding to each pixel 114 of first display panel 100 in FIG. 8. For example, the pixel information includes information indicating a gradation of the image displayed on each pixel 114. In the example of FIG. 10, for example, the image corresponding to the gradation of "R11" is displayed in the pixel (red pixel 114R) at the upper left end, and the image corresponding to the gradation of "G12" is displayed in the pixel (green pixel 114G) adjacent to the right of red pixel 114R. Consequently, the color image corresponding to input video signal Data is displayed in first image display region 110a of first display panel 100.

Figure 11:
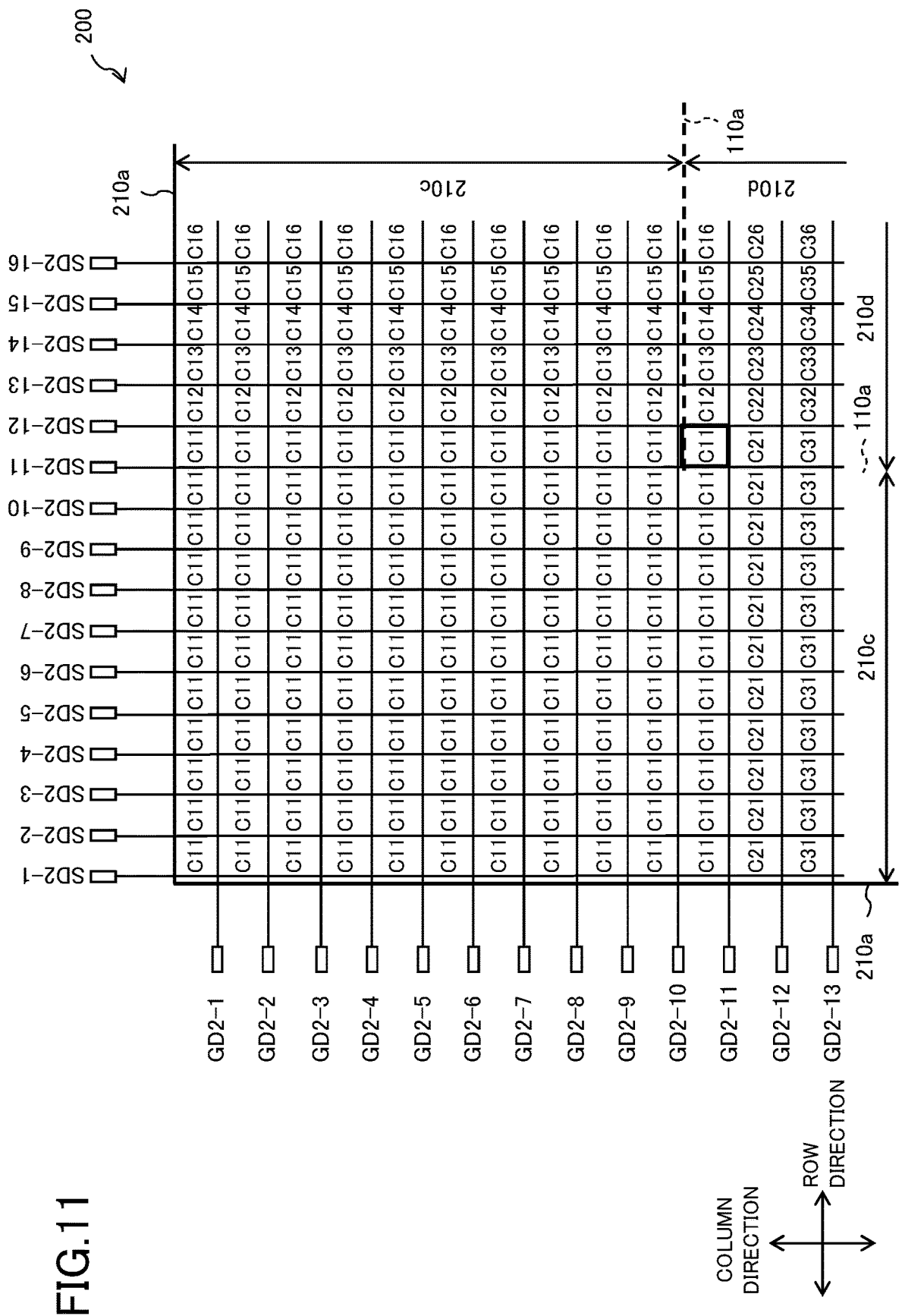
FIG. 11 is a view illustrating pixel information corresponding to each pixel of the second display panel in FIG. 9.

FIG. 11 is a view illustrating pixel information corresponding to each pixel 214 of second display panel 200 in FIG. 9. In opposed display region 210d of second image display region 210a of second display panel 200, the image corresponding to the gradation of "C11" is displayed in pixel 214 (a thick-line enclosed portion in FIG. 11) at the upper left end, and the image corresponding to the gradation of "C12" is displayed in pixel 214 adjacent to the right. Consequently, the black-and-white image corresponding to input video signal Data is displayed in opposed display region 210d.

The same image as the image displayed in pixel 214 at the end of opposed display region 210d is displayed in extended display region 210c of second image display region 210a of second display panel 200. Specifically, in extended display region 210c, the image corresponding to the gradation of "C11" is displayed in pixels 214 included in the first to tenth columns and the first to tenth rows of second image display region 210a in the same manner as pixel 214 at the upper left end of opposed display region 210d, the image corresponding to the gradation of "C11" is displayed in pixel 214 of the eleventh column in the same manner as pixel 214 at the upper end of opposed display region 210d, the image corresponding to the gradation of "C12" is displayed in pixel 214 of the twelfth column, and the image corresponding to the gradation of "C13" is displayed in pixel 214 of the thirteenth column. In extended display region 210c, the image corresponding to the gradation of "C11" is displayed in pixel 214 of the eleventh row in the same manner as pixel 214 at the upper end of opposed display region 210d, the image corresponding to the gradation of "C21" is displayed in pixel 214 of the twelfth row, and the image corresponding to the gradation of "C31" is displayed in pixel 214 of the thirteenth row. In this way, when the display screen is viewed from the oblique direction (see FIG. 7), extended display region 210c of second display panel 200 overlaps first image display region 110a of first display panel 100, and the same image as the end of opposed display region 210d is displayed in extended display region 210c, so that the image corresponding to the input video signal can also visually be recognized at the end of the display screen.

As described above, in liquid crystal display device 10, second image display region 210a of second display panel 200 is larger than first image display region 110a of first display panel 100 in first display panel 100 disposed closer to the observer and second display panel 200 disposed farther from the observer than first display panel 100. The size of second image display region 210a is set according to a structure of liquid crystal display device 10. A method for defining a difference between first image display region 100a and second image display region 210a (that is, extended display region 210c) will be described below.

Figure 12A:
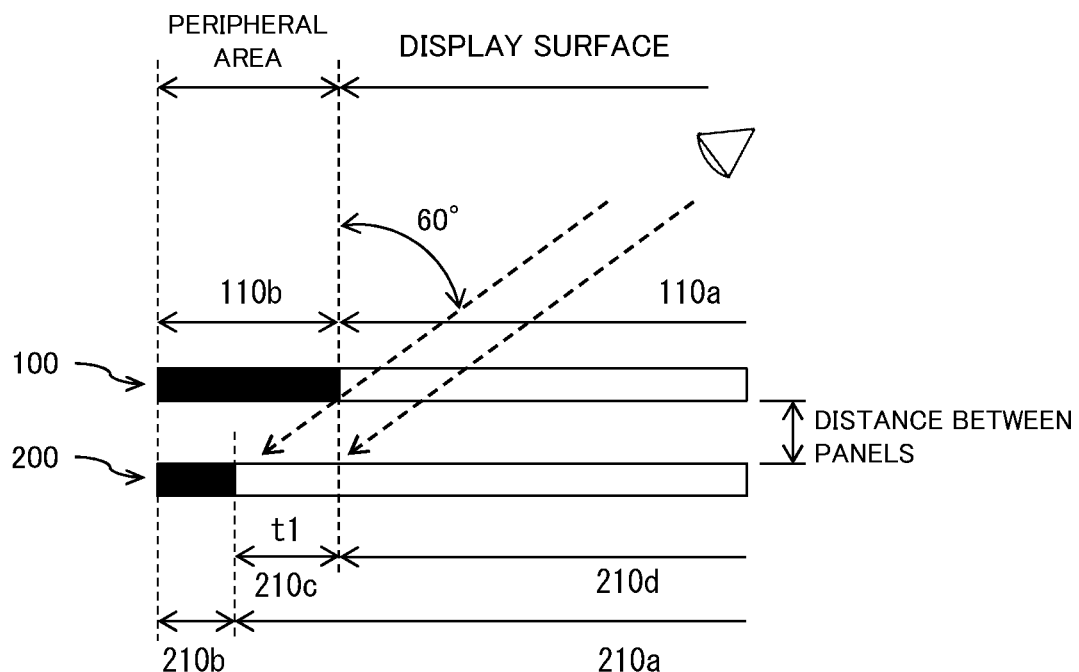
FIG. 12A is a view illustrating a method for defining an extended display region of the second display panel.
Figure 12B:
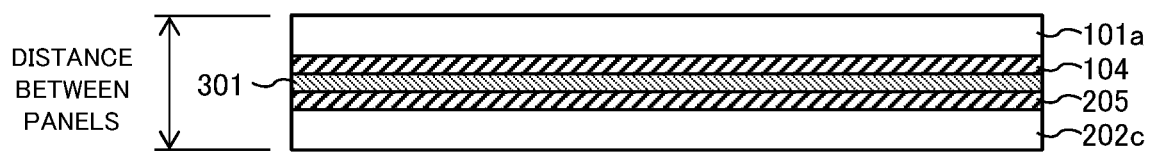
FIG. 12B is a view illustrating a method for defining an extended display region of the second display panel.

FIGS. 12A and 12B are views illustrating the method for defining extended display region 210c. FIG. 12A is a sectional view illustrating a state in which the display screen is viewed from the oblique direction of 60 degrees with respect to the vertical direction. FIG. 12B is a view illustrating a sectional structure near the boundary portion between first display panel 100 and second display panel 200. For example, width t1 of extended display region 210c is set to a value such that second non-display region 210b does not overlap first image display region 110a when the display screen is viewed from the 60-degree oblique direction. Width t1 of extended display region 210c mainly depends on an inter-panel distance in FIG. 12B. Specifically, the inter-panel distance is calculated from a total of thicknesses of glass substrate 101a and polarizing plate 104 that constitute first display panel 100, thicknesses of glass substrate 202c and polarizing plate 205 that constitute second display panel 200, and a thickness of diffusion sheet 301 disposed between first display panel 100 and second display panel 200. Width t1 of extended display region 210c is also affected by refractive indices of glass substrates 101a, 202c. Thus, width t1 of extended display region 210c is set based on the inter-panel distance and the refractive indices of glass substrates 101a, 202c. For example, width t1 of extended display region 210c is set to a larger value with increasing inter-panel distance, and width t1 is set to a smaller value with decreasing refractive indices of glass substrates 101a, 202c.

A number and a size of pixels 214 arranged in extended display region 210c are decided when width t1 of extended display region 210c is calculated based on the inter-panel distance and the refractive indices. In this way, the structure of extended display region 210c is defined.

Figure 13:
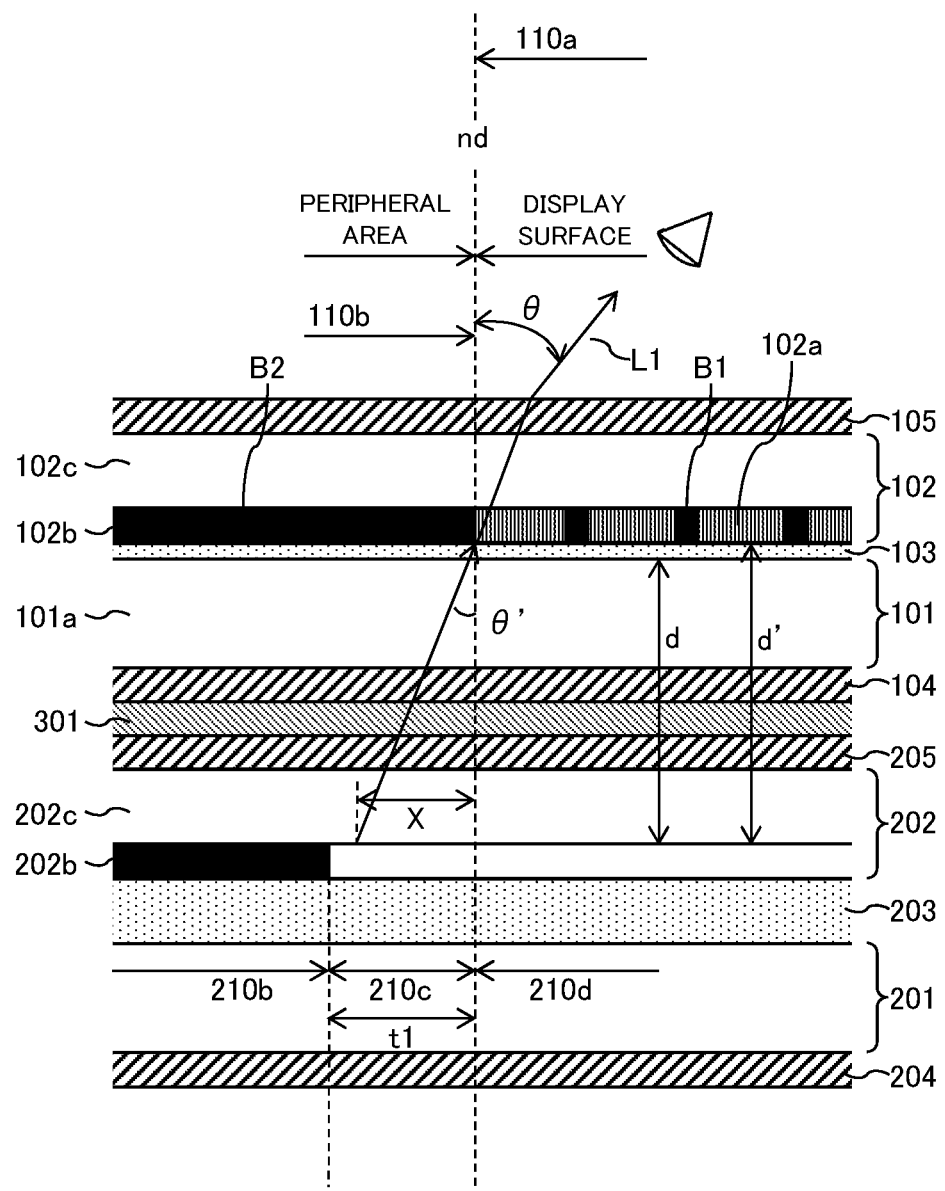
FIG. 13 is a view illustrating an example of a method for deciding a width of the extended display region based on an inter-panel distance and a refractive index.

FIG. 13 is a view illustrating an example of a method for deciding width t1 of extended display region 210c based on the inter-panel distance and the refractive indices. As illustrated in FIG. 13, in the case that the display screen is observed from the direction inclined by angle θ with respect to direction nd normal to the surface of first display panel 100, video light from second display panel 200 is refracted according to the refractive index of each of the layers constituting liquid crystal display device 10, and then is directed from the direction inclined by angle θ to observer's eyes. At this point, as illustrated in FIG. 13, attention is paid to light L1 that passes through pixel 114 located at the end of first image display region 110a from pixel 214 of second display panel 200 and enters the observer's eyes from the direction inclined by angle θ. Assuming that parallax countermeasure width X is an amount in which light L1 is shifted from the boundary portion between extended display region 210c and opposed display region 210d on the surface of the layer on which black matrix 202b of CF substrate 202 is formed. In the case that width t1 of extended display region 210c is greater than or equal to parallax countermeasure width X, the image at the end can be checked with desired brightness even if the observer observes the display screen from the direction inclined by angle θ.

As described above, in order to strictly obtain necessary parallax countermeasure width X, it is necessary to perform a calculation in consideration of the refractive index and the thickness of each layer located between the layer in which black matrix 102b of first display panel 100 is disposed and the layer in which black matrix 202b of second display panel 200 is disposed. However, the refractive index difference between these layers is small, and glass substrate 101a constituting TFT substrate 101 of first display panel 100 and glass substrate 202c constituting CF substrate 202 of second display panel 200 contribute largely to the decision of parallax countermeasure width X because glass substrate 101a and glass substrate 202c are thick. For this reason, each layer located between the layer in which black matrix 102b of first display panel 100 is disposed and the layer in which black matrix 202b of second display panel 200 is disposed is regarded as a single layer, and refractive index n of the single layer is regarded as an average value of refractive index n1 of glass substrate 101a of first display panel 100 and refractive index n2 of glass substrate 202c of second display panel 200. That is, the following equation (1) is given.

Refractive index of single layer $n=$(refractive index $n1+$refractive index $n2)/2$ (1)

According to this assumption, the layer between the layer in which black matrix 102b of first display panel 100 is disposed and the layer in which black matrix 202b of second display panel 200 is disposed can be regarded as the single layer. Consequently, assuming that d' is a distance between the layer in which black matrix 102b of first display panel 100 is disposed and the layer in which black matrix 202b of second display panel 200 is disposed, the following equation (2) is given by a geometrical relationship in FIG. 13.

parallax countermeasure width $X=$distance $d'\times\tan\theta'$ (2)

At this point the following equation (3) is satisfied due to the geometrical relationship in FIG. 13.

$n\times\sin\theta'=1\times\sin\theta$ (3)

Even in the lateral electric field (IPS) system liquid crystal display panel that is said to have the widest viewing angle, the inventors have found by experiments that the observer is free from a sense of discomfort even if a display abnormality is generated when the observer observes the display screen from the direction inclined by at least 60 degrees, unless the display abnormality is generated at the end of the display image when the observer observes the display screen from the direction inclined by 60 degrees. Thus, preferably angle θ is set to 60 degrees in order to obtain necessary parallax countermeasure width X. Assuming that angle θ is 60 degrees, when tan θ' is calculated from the equation (3), the following equation (4) is obtained.

$$\tan\theta' = \frac{\sqrt{3}}{\sqrt{4n^2-3}}$$ (4)

The following equation (5) is obtained by substituting the equation (4) into the equation (2).

$$\text{parallax countermeasure width } X = \text{distance } d' \times \frac{\sqrt{3}}{\sqrt{4n^2-3}}$$ (5)

At this point, the thickness of liquid crystal layer 103 can be ignored because the thickness of liquid crystal layer 103 is negligibly small as compared with other layers. Thus, distance d' can be regarded as distance d from the observer-side surface in glass substrate 101a (that is, glass substrate 101a constituting TFT substrate 101 of first display panel 100) constituting first display panel 100 on the side of second display panel 200 to the surface on the opposite side to the observer side in glass substrate 202c (that is, glass substrate 202c constituting CF substrate 202 of second display panel 200) constituting second display panel 200 on the side of first display panel 100 (see FIG. 13). Thus, the following equation (6) is obtained by substituting distance d'=distance d into the equation (5).

$$\text{parallax countermeasure width } X = \text{distance } d \times \frac{\sqrt{3}}{\sqrt{4n^2-3}}$$ (6)

As described above, the display defect at the end can be prevented when width t1 of extended display region 210c is greater than or equal to parallax countermeasure width X, so that the display defect at the end can efficiently be prevented from the expression (6) when width t1 of extended display region $$210c \geq \text{parallax countermeasure width } X = \text{distance } d \times \frac{\sqrt{3}}{\sqrt{4n^2-3}}$$ (7)

is satisfied.

Table 1 is a table illustrating the result in which necessary parallax countermeasure width X is simulated by changing the thickness of each layer while observation angle θ of the observer is set to 60 degrees. A typical refractive index value of each layer are used. Specifically, the values illustrated in Table 1 are used.

TABLE 1

| | REFRACTIVE INDEX | SAMPLE 1 | SAMPLE 2 |
|---|---|---|---|
| GLASS 101a OF TFT SUBSTRATE 101 | 1.50 | 1.0 mm | 0.5 mm |
| POLARIZING PLATE 104 | 1.49 | 0.2 mm | 0.3 mm |
| DIFFUSION SHEET 301 | 1.58 | 0.5 mm | 0.3 mm |
| POLARIZING PLATE 205 | 1.49 | 0.2 mm | 0.3 mm |
| GLASS 202c OF CF SUBSTRATE 202 | 1.50 | 1.0 mm | 0.5 mm |
| DISTANCE d | | 2.9 mm | 1.9 mm |
| NECESSARY PARALLAX COUNTERMEASURE WIDTH X' | | 2.03 mm | 1.33 mm |

When necessary parallax countermeasure width X' is calculated in consideration of the refractive index of each layer, as illustrated in Table 1, 2.03 mm and 1.33 mm are obtained for samples 1, 2, respectively. On the other hand, when necessary parallax countermeasure width X is calculated from the equation (6), 2.05 mm and 1.34 mm are obtained for samples 1, 2, respectively. Because the size of one pixel is at least about 0.13 mm, the difference between parallax countermeasure width X' obtained from the actual calculation and parallax countermeasure width X obtained from the expression (6) is a value enough to be acceptable as compared with the size of the pixel, and the expression (6) can be used as parallax countermeasure width X.

A method for driving liquid crystal display device 10 will be described below. In liquid crystal display device 10, the number of pixels 114 of first display panel 100 is different from the number of pixels 214 of second display panel 200, and therefore first display panel 100 is different from second display panel 200 in the number of signal lines (data lines, gate lines). For this reason, in first display panel 100 and second display panel 200, it is necessary to adjust timing of driving each signal line.

Figure 14:
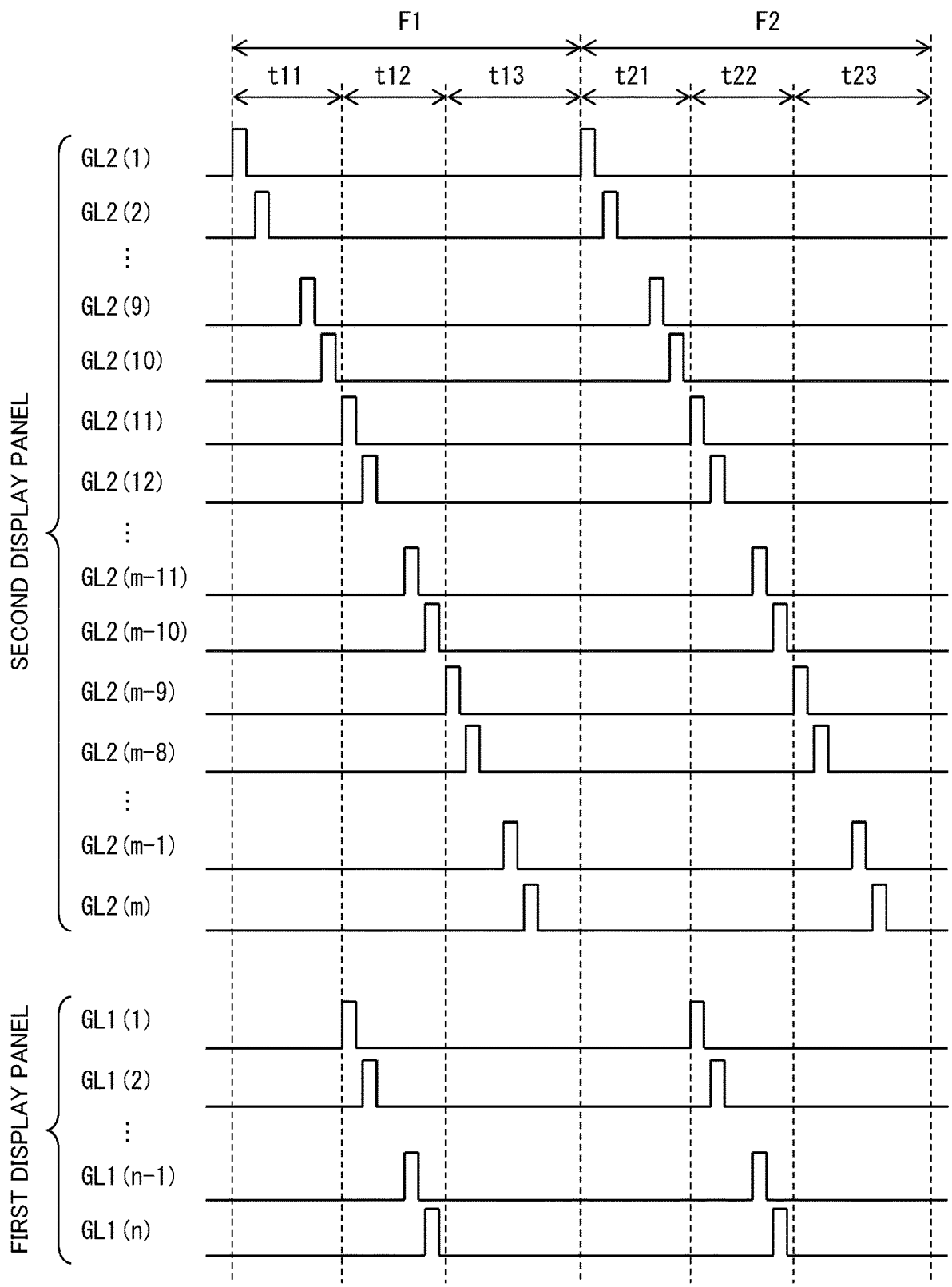
FIG. 14 is a timing chart illustrating timing of driving a gate line of the first display panel and timing of driving a gate line of the second display panel.

FIG. 14 is a timing chart illustrating timing of driving gate line 112 of first display panel 100 and timing of driving gate line 212 of second display panel 200. At this point, it is assumed that n gate lines 112 are provided in first display panel 100 and m gate lines 212 are provided in second display panel 200. It is also assumed that the numbers of pixels 114 and signal lines arranged in first display panel 100 are equal to the numbers of pixels 214 and signal lines arranged in opposed display region 210d of second display panel 200. Additionally, as illustrated in FIGS. 8 and 9, it is assumed that ten more gate lines 212 than that of first display panel 100 are vertically arranged in second display panel 200. In FIG. 13, GL1(1) indicates the gate signal supplied to gate line 112 of the first row of first display panel 100, and GL1(n) indicates the gate signal supplied to gate line 112 of the last nth row. GL2(1) indicates the gate signal supplied to gate line 212 of the first row of second display panel 200, and GL2(m) indicates the gate signal supplied to gate line 212 of the last mth row. GL2(1) to GL2(10), GL2(m−9) to GL2(m) indicate the gate signals supplied to gate lines 212 arranged in extended display region 210c. Thus, gate lines 112 from the first row to the nth row of first display panel 100 and gate lines 212 from the eleventh row to the (m−10)th row of second display panel 200 are arranged while overlapping each other in planar view of liquid crystal display device 10.

In first frame F1 of the above configuration, in second display panel 200, gate signals GL2(1) to GL2(10) are sequentially supplied to gate lines 212 from the first row to the tenth row, and the data voltage corresponding to the image information in FIG. 11 is supplied to pixel electrode 215. Subsequently, gate signals GL2(11) to GL2(m−10) are sequentially supplied to gate lines 212 from the eleventh row to the (m−10)th row in second display panel 200 at the same time as gate signals GL1(1) to GL1(n) are sequentially supplied to gate lines 112 from the first row to the nth row in first display panel 100, and the data voltage corresponding to the image information in FIG. 11 is supplied to pixel electrode 215 at the same time as the data voltage corresponding to the image information in FIG. 10 is supplied to pixel electrode 115. Subsequently, in second display panel 200, gate signals GL2(m−9) to GL2(m) are sequentially supplied to gate lines 212 from the (m−9)th row to the mth row, and the data voltage corresponding to the image information in FIG. 11 is supplied to pixel electrode 215. As described above, the image is displayed in extended display region 210c of second display panel 200 during periods t11, t13 in first frame F1, and the image is displayed in first image display region 110a of first display panel 100 and opposed display region 210d of second display panel 200 during period t12. The same operation as first frame F1 is performed in second frame F2. The same operation is also performed in subsequent frames.

Liquid crystal display device 10 performs the display operation as described above. The display operation is not limited to the above method.

Liquid crystal display device 10 is not limited to the above configuration. For example, various modes can be applied to the configuration of extended display region 210c of second display panel 200. Another configuration example of extended display region 210c will be described below.

Figure 15:
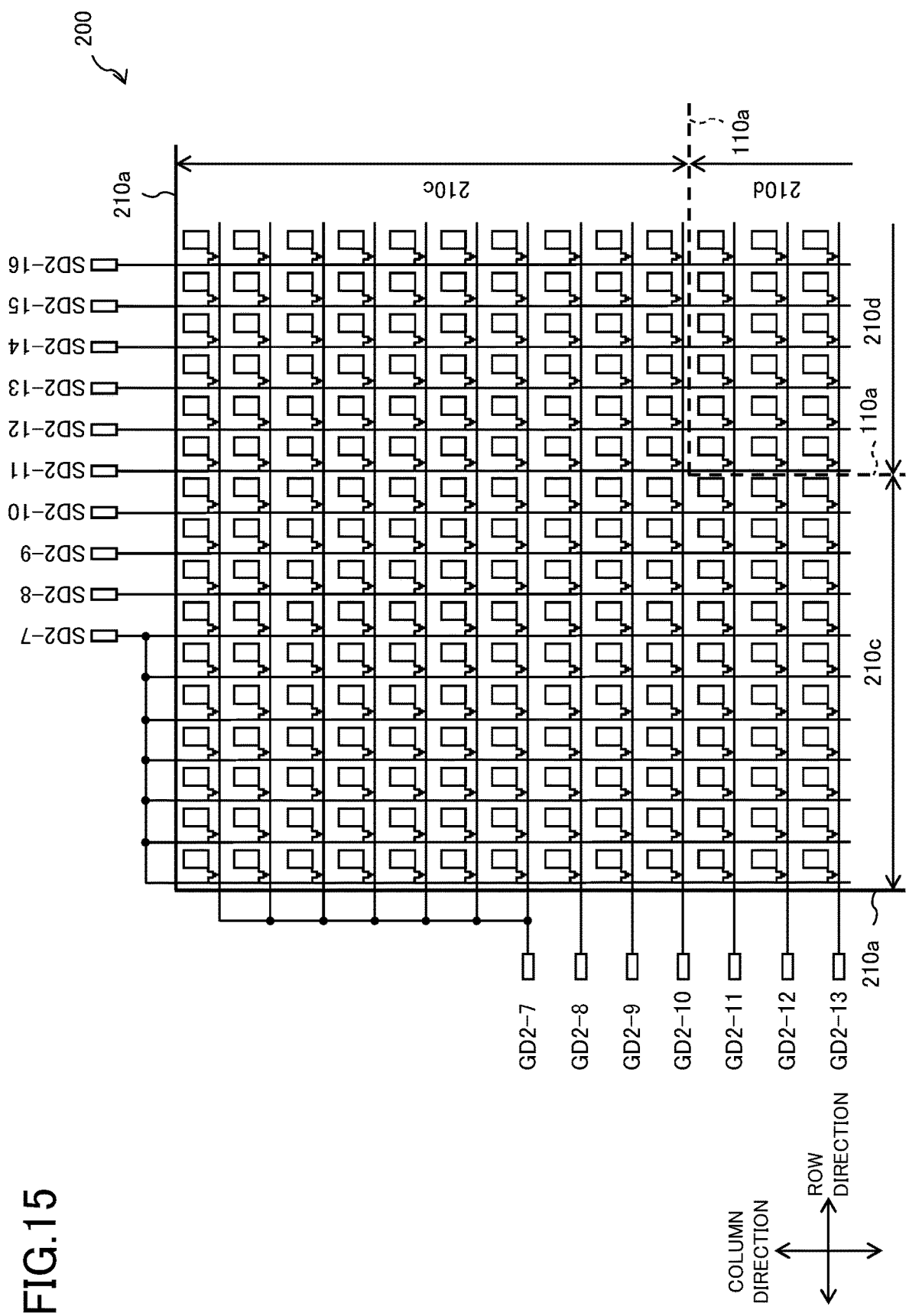
FIG. 15 is a plan view illustrating a configuration of a second display panel according to Modification 1.
Figure 16:
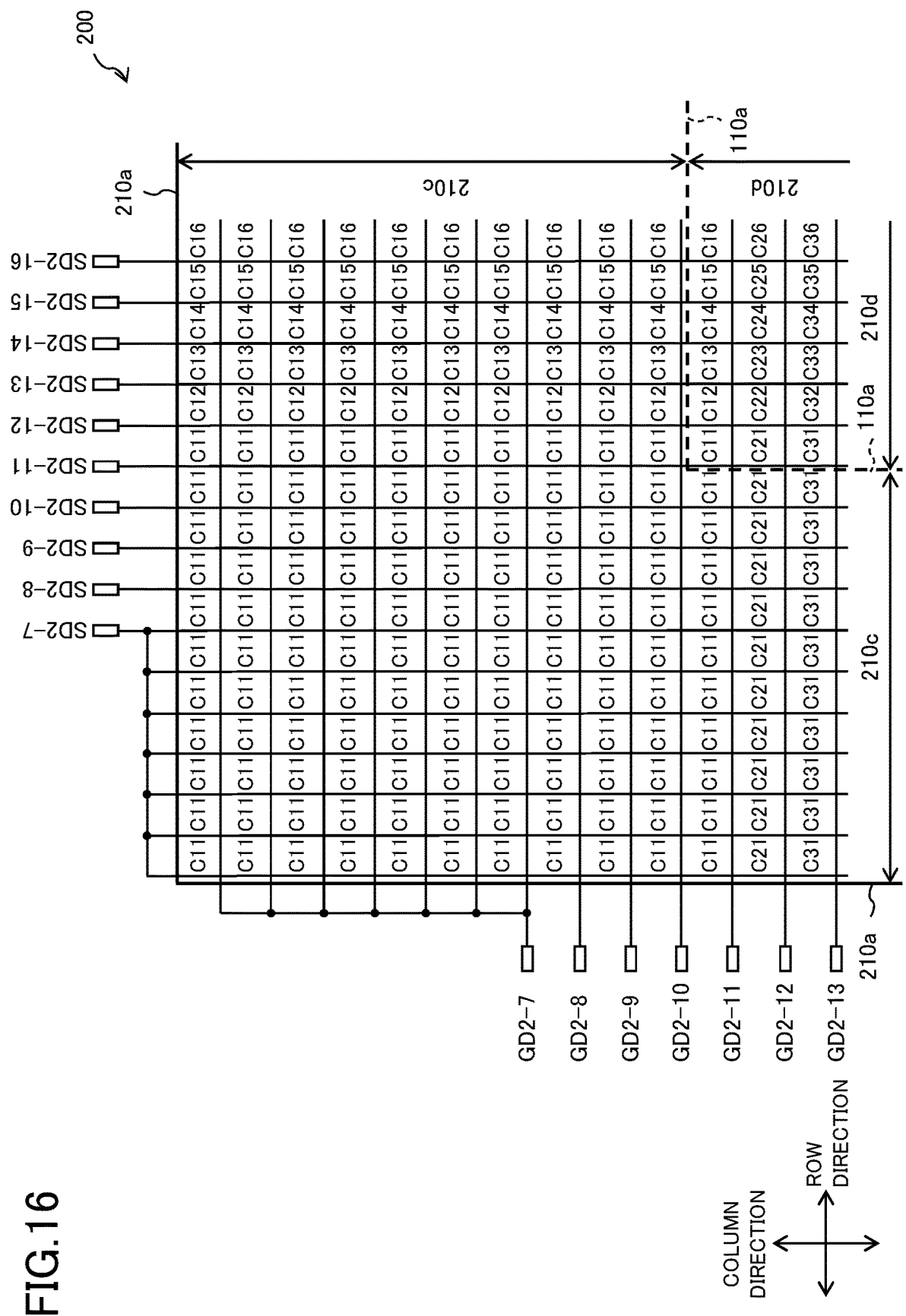
FIG. 16 is a view illustrating pixel information corresponding to each pixel of the second display panel of Modification 1.

As described above, the same image is displayed on a part of the plurality of pixels 214 arranged in extended display region 210c. For example, in FIG. 11, the images corresponding to the gradation of "C11" are displayed in eleven pixels 214 arranged in the row direction in the first row, and the images corresponding to the gradation of "C21" are displayed in ten pixels 214 arranged in the row direction in the twelfth row. As illustrated in FIGS. 15 and 16, the signal lines (data lines 211 and gate lines 212) corresponding to the plurality of pixels in which the same image is displayed may be driven at the same time. FIG. 15 is a plan view illustrating a configuration of second display panel 200 according to Modification 1, and FIG. 17 is a plan view illustrating a configuration of second display panel 200 according to Modification 2.

In second display panel 200 of FIG. 15, seven data lines 211 from the first column to the seventh column are connected to one output terminal SD2-7, and seven gate lines 212 from the first row to the seventh row are connected to one output terminal GD2-7. That is, the signal line connected to one output terminal SD2-7 is branched into seven data lines 211, and the signal line connected to one output terminal GD2-7 is branched into seven gate lines 212. In FIG. 15, for convenience, the output terminal is indicated by the number corresponding to the position of the output terminal in FIG. 9. The same holds true for the following drawings. In display panel 200 of Modification 1, as illustrated in FIG. 16, the image is displayed in the same manner as display panel 200 (see FIG. 11).

Figure 17:
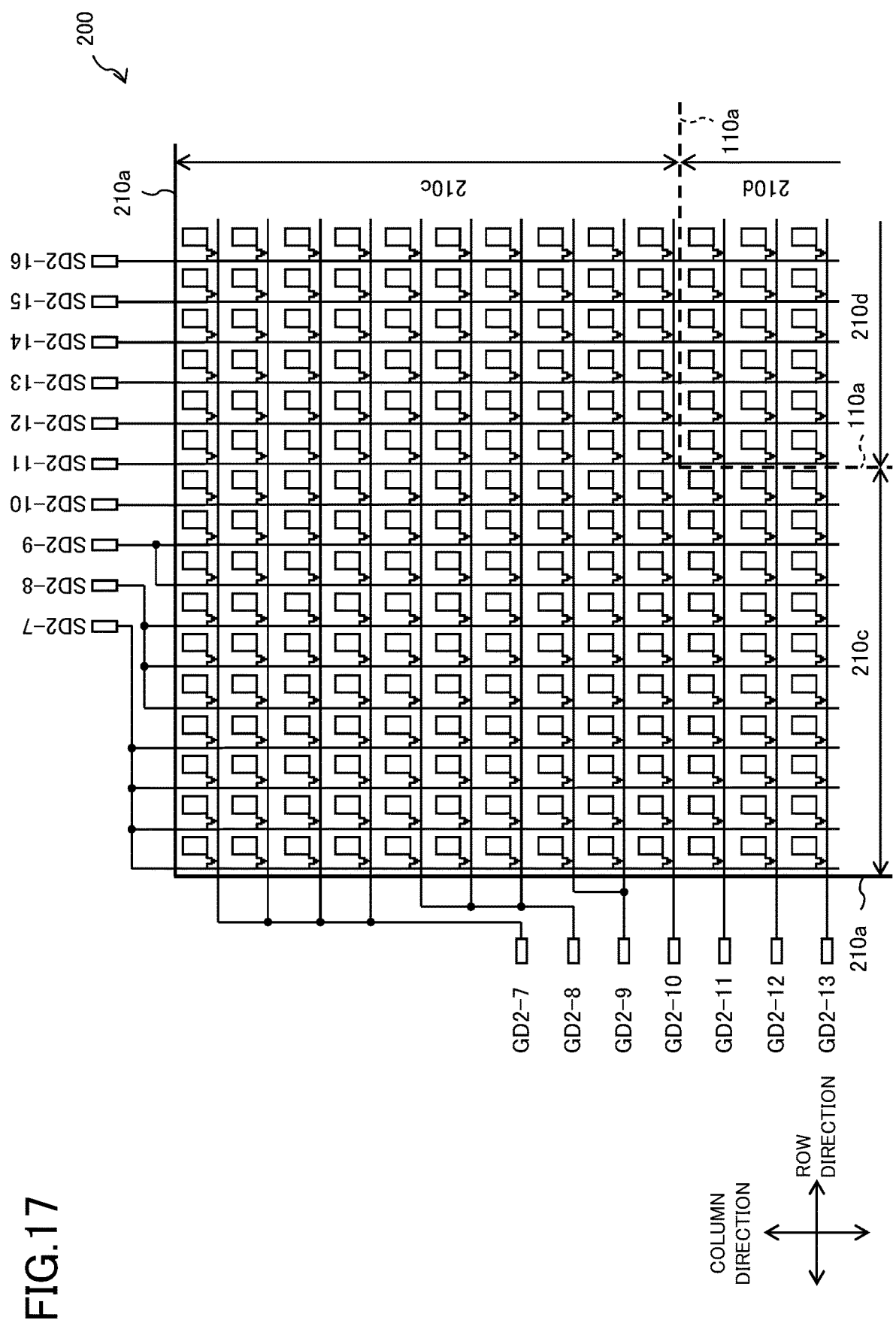
FIG. 17 is a plan view illustrating a configuration of a second display panel according to Modification 2.

In second display panel 200 of FIG. 17, four data lines 211 from the first column to the fourth column are connected to one output terminal SD2-7, three data lines 211 from the fifth column to the seventh column are connected to one output terminal SD2-8, two data lines 211 of the eighth column and the ninth column are connected to one output terminal SD2-9, and data line 211 of the tenth column is connected to one output terminal SD-10. Similarly, four gate lines 212 from the first row to the fourth row are connected to one output terminal GD2-7, three gate lines 212 from the fifth row to the seventh row are connected to one output terminal GD2-8, two gate lines 212 of the eighth row and the ninth row are connected to one output terminal GD2-9, and gate line 212 on the tenth row is connected to output terminal GD-10. That is, the signal line connected to one output terminal SD-7 is branched into four data lines 211, the signal line connected to one output terminal SD-8 is branched into three data lines 211, and the signal line connected to one output terminal SD-9 is branched into two data lines 211. Similarly, the signal line connected to one output terminal GD-7 is branched into four gate lines 212, the signal line connected to one output terminal GD-8 is branched into three gate lines 212, and the signal line connected to one output terminal GD-9 is branched into two gate lines 212. In this way, display panel 200 is configured such that the number of branches of data line 211 and the number of branches of gate line 212 are decreased as data line 211 and gate line 212 approach opposed display region 210d (first image display region 110a).

Figure 18:
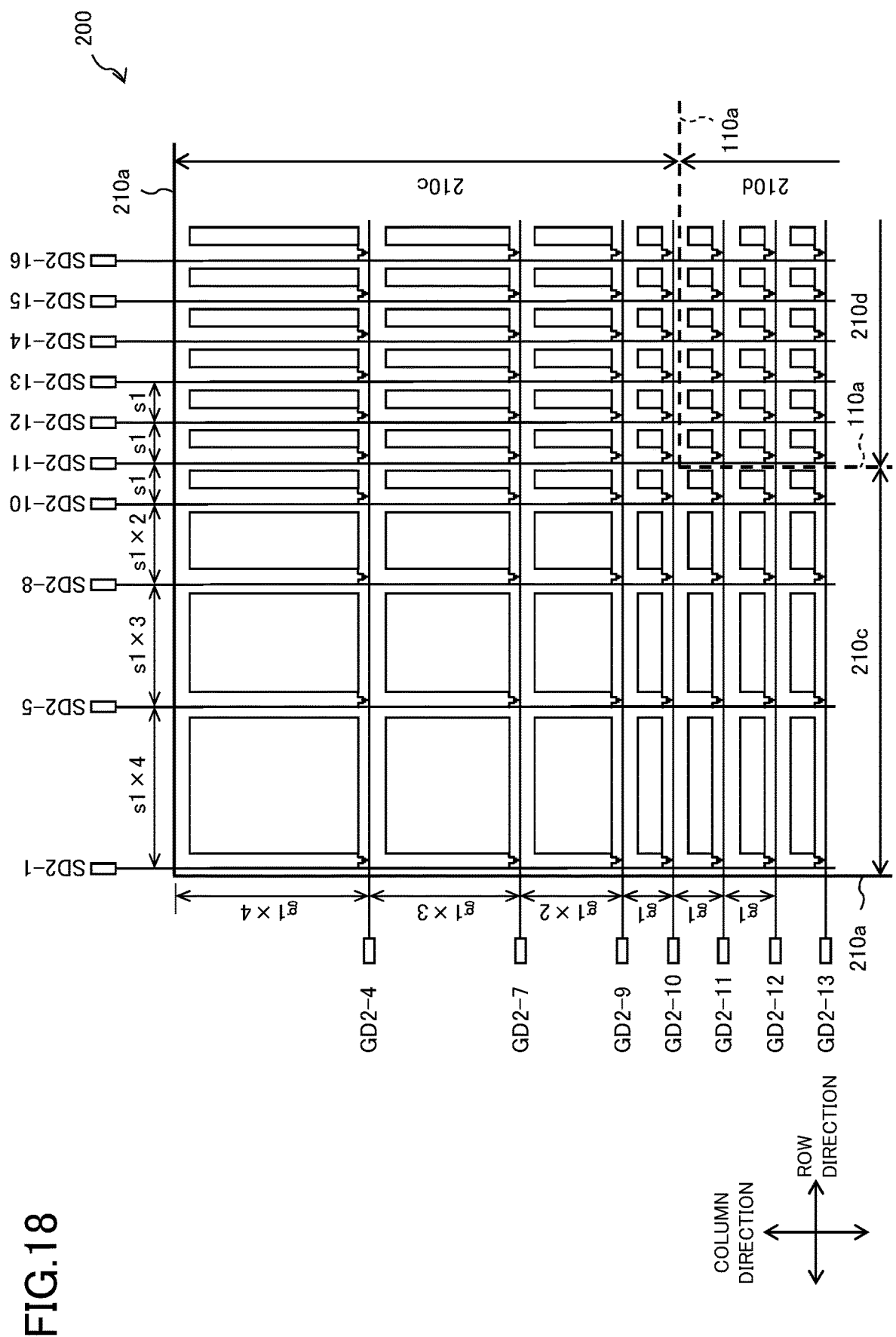
FIG. 18 is a plan view illustrating a configuration of a second display panel according to Modification 3.
Figure 19:
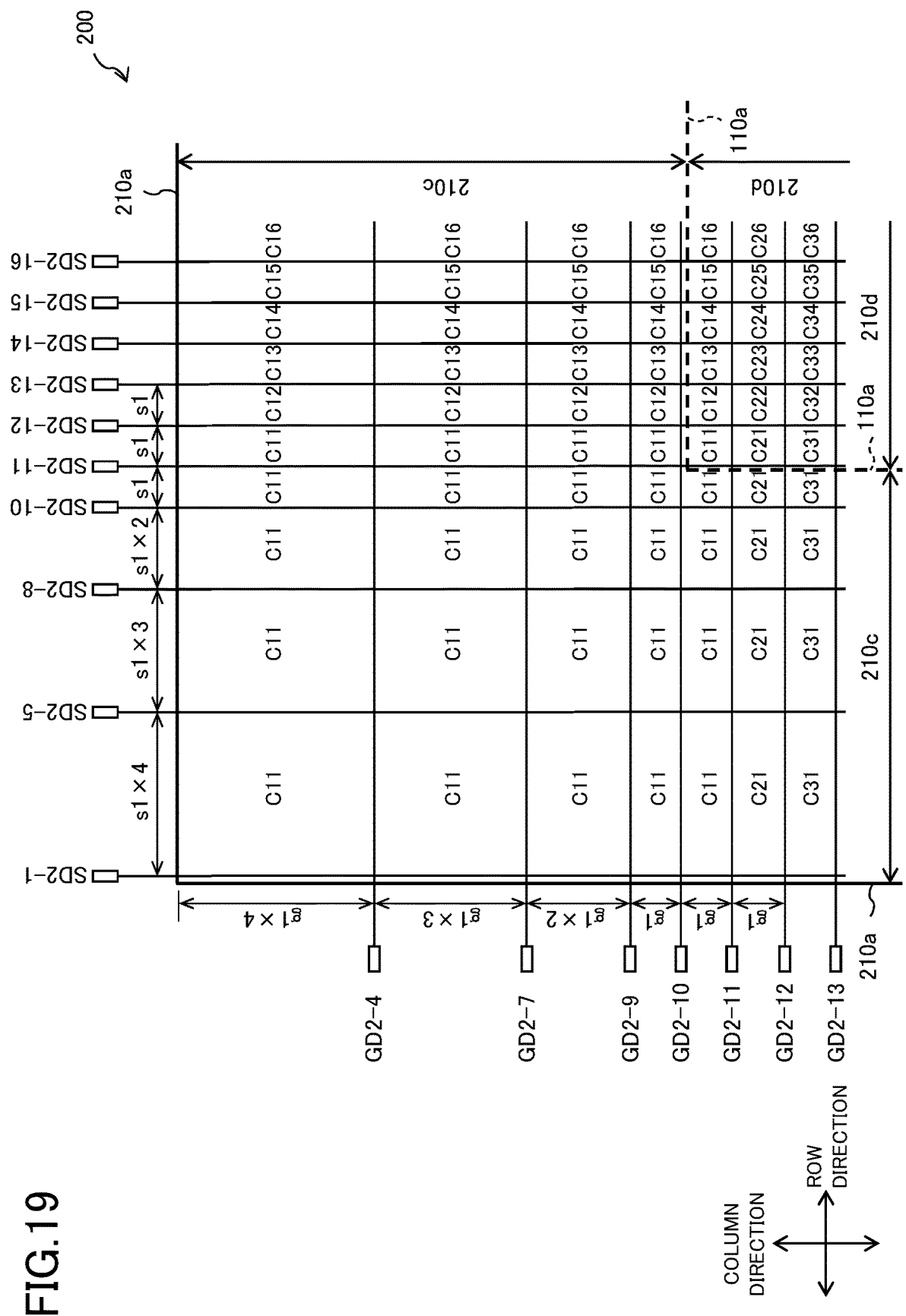
FIG. 19 is a view illustrating pixel information corresponding to each pixel of the second display panel of Modification 3.

In each of the configurations in FIGS. 9, 15, and 17, the plurality of pixels 214 have the same size as each other. However, the present invention is not limited this configuration. For example, a part of the plurality of pixels 214 arranged in extended display region 210c may have a size different from other pixels 214. FIG. 18 is a plan view illustrating a configuration of second display panel 200 according to Modification 3. In second display panel 200 of FIG. 18, the plurality of pixels 214 arranged in extended display region 210c is configured such that the size of pixel 214 is enlarged with increasing distance from opposed display region 210d (first image display region 110a). For example, assuming that s1 is a pitch in the row direction of the plurality of pixels 214 arranged in opposed display region 210d, the plurality of pixels 214 are arranged in extended display region 210c such that the pitch of pixel 214 in the fourth column becomes s1, such that the pitch of pixel 214 in the third column becomes s1×2, such that the pitch of pixel 214 in the second column becomes s1×3, and such that the pitch of pixel 214 in the first column becomes s1×4. That is, as compared with pixels 214 arranged in opposed display region 210d, pixel 214 in the fourth column has the size multiplied by one in the row direction, pixel 214 in the third column has the size multiplied by two in the row direction, pixel 214 in the second column has the size multiplied by three in the row direction, and pixel 214 in the first column has the size multiplied by four in the row direction. Similarly, for example, assuming that g1 is a pitch in the column direction of the plurality of pixels 214 arranged in opposed display region 210d, the plurality of pixels 214 arranged in extended display region 210c are arranged such that the pitch of pixels 214 of the fourth row becomes g1, such that the pitch of pixels 214 in the third row becomes g1×2, such that the pitch of pixels 214 in the second row becomes g1×3, and such that the pitch of pixels 214 in the first row becomes g1×4. That is, as compared with pixels 214 arranged in opposed display region 210d, pixel 214 in the fourth row has the size multiplied by one in the column direction, pixel 214 in the third row has the size multiplied by two in the column direction, pixel 214 in the second row has the size multiplied by three in the column direction, and pixel 214 in the first row has the size multiplied by four in the column direction. In second display panel 200 of Modification 3, as illustrated in FIG. 19, the image is displayed in the same manner as each of second display panels 200 described above.

According to second display panel 200 of Modifications 1 to 3, the number of outputs of each driver can be decreased as compared with the configuration in FIG. 9. According to second display panel 200 of Modifications 1 and 2, the plurality of gate lines 212 can simultaneously be driven (selected), so that the display time (drive time) of extended display region 210c can be shortened as compared with the configurations in FIGS. 9 and 13. As described above, pixels 214 arranged in extended display region 210c can have the configuration different from that of pixels 214 arranged in opposed display region 210d. However, preferably pixels 214 arranged in extended display region 210c is configured to come close to the condition (the number of branches of the signal line or the size of the pixel) corresponding to pixel 214 of opposed display region 210d as pixel 214 comes close to opposed display region 210d.

Figure 20:
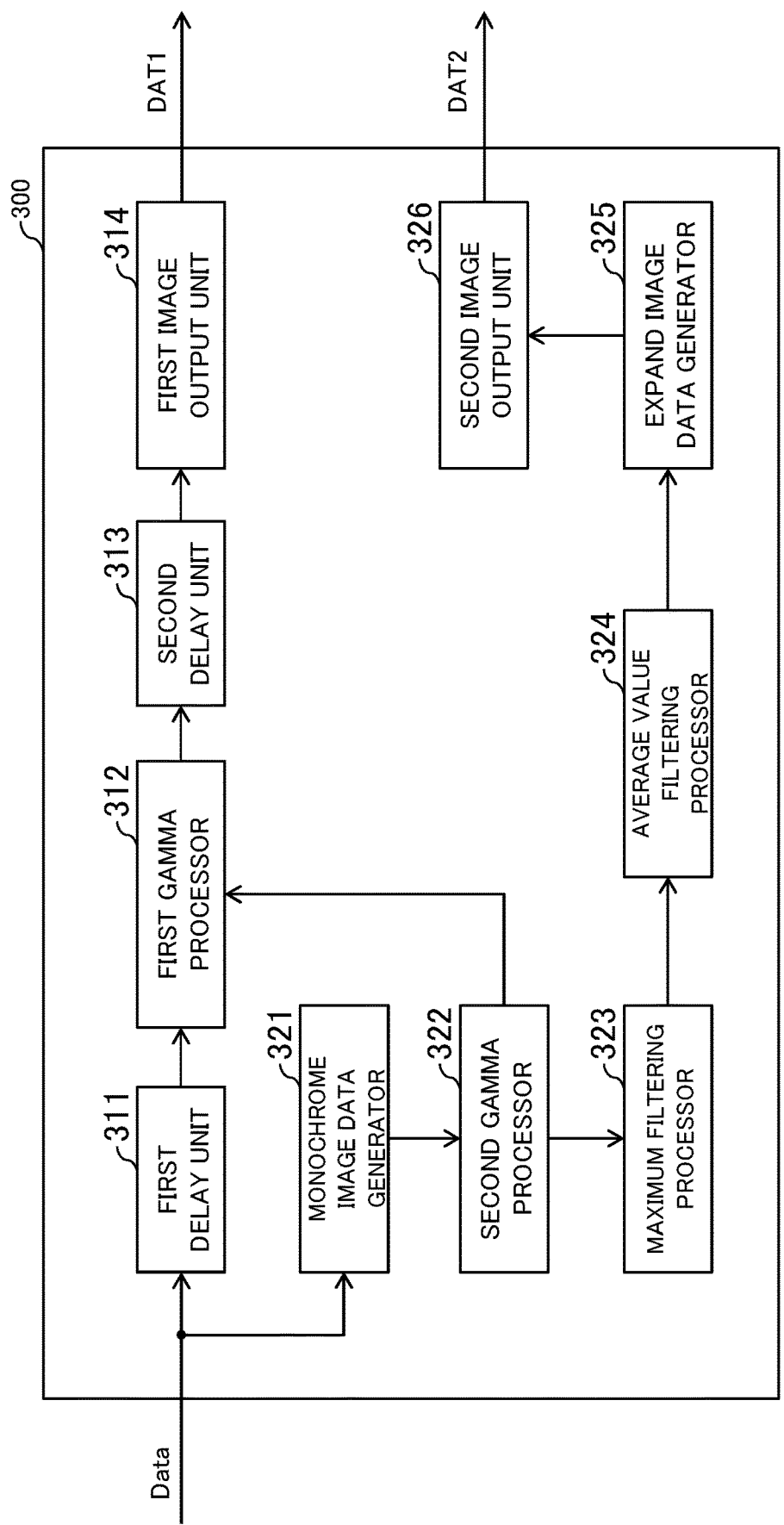
FIG. 20 is a block diagram illustrating a specific configuration of an image processor of the exemplary embodiment.

A specific configuration of image processor 300 will be described below. FIG. 20 is a block diagram illustrating the specific configuration of image processor 300. Image processor 300 includes first delay part 311, first gamma processor 312, second delay part 313, first image output part 314, black-and-white image data generation part 321, second gamma processor 322, maximum value filter processing part 323, average value filter processing part 324, extended display image data generator 325, and second image output part 326.

When receiving input video signal Data transmitted from an external system, image processor 300 transfers input video signal Data to first delay part 311 and black-and-white image data generation part 321. For example, input video signal Data includes luminance information (gradation information) and color information. Black-and-white image data generation part 321 generates black-and-white image data corresponding to the black-and-white image based on input video signal Data. Second gamma processor 322 performs gamma processing on the black-and-white image displayed on second display panel 200 based on the black-and-white image data. For example, second gamma processor 322 sets a gamma value (second gamma value) to 0.3.

Based on input video signal Data output from first delay part 311 and the second gamma value ($\gamma=0.3$) output from second gamma processor 322, first gamma processor 312 performs the gamma processing on the color image displayed on first display panel 100. For example, first gamma processor 312 sets the gamma value (first gamma value) of the color image to 1.9 such that a combined gamma value of the display image in which the black-and-white image and the color image are combined becomes 2.2. First gamma processor 312 outputs the color image data (first image data) subjected to the gamma processing to second delay part 313.

Maximum value filter processing part 323 performs the maximum value filter processing based on the black-and-white image data output from second gamma processor 322. Maximum value filter processing part 323 can apply known maximum value filter processing. For example, maximum value filter processing part 323 sets a circular area of 11 pixels×11 pixels to a filter size, and performs the maximum value filter processing. Consequently, for example, a high-luminance region (white region) can be enlarged.

Average value filter processing part 324 performs average value filter processing based on the black-and-white image data output from maximum value filter processing part 323. Average value filter processing part 324 can apply known average value filter processing. For example, average value filter processing part 324 sets the circular area of 11 pixels×11 pixels to the filter size, and performs the average value filter processing. Consequently, for example, a high-frequency component is eliminated, so that a luminance change can be smoothed.

Based on the black-and-white image data output from average value filter processing part 324, extended display image data generator 325 generates the extended display image data (second image data) of the black-and-white image corresponding to second image display region 210a including extended display region 210c (see FIG. 9). For example, extended display image data generator 325 generates the second image data based on the number of pixels 214 in extended display region 210c defined by the method in FIG. 12. Extended display image data generator 325 outputs the generated second image data to second image output part 326.

Second delay part 313 outputs the first image data output from first gamma processor 312 to first image output unit 314 in synchronization with output timing of extended display image data generator 325.

First image output part 314 outputs first image data DAT 1 to first timing controller 140, and second image output part 326 outputs second image data DAT 2 to second timing controller 240. Image processor 300 outputs first control signal CS1 to first timing controller 140, and outputs second control signal CS2 to second timing controller 240 (see FIGS. 2 and 3).

Image processor 300 is not limited to the above configuration. For example, extended display image data generator 325 may be provided between second gamma processor 322 and maximum value filter processing part 323. That is, image processor 300 may perform the maximum value filter processing and the average value filter processing on extended display image data.

In the exemplary embodiment, second display panel 200 displays the black-and-white image and includes black matrix 202. However, black matrix 202b of second display panel 200 may not necessarily be provided.

In the above, the specific embodiments of the present application have been described, but the present application is not limited to the above-mentioned embodiments, and various modifications may be made as appropriate without departing from the spirit of the present application.

The invention claimed is:

1. A display device comprising:
a first display panel; and
a second display panel disposed farther from an observer than the first display panel, wherein
an image display region of the second display panel is larger than an image display region of the first display panel,
the image display region of the second display panel includes an opposed display region facing the image display region of the first display panel in planar view and an extended display region around the opposed display region,
the second display panel displays an image identical to an image displayed at an end of the opposed display region in the extended display region, and
a width of the extended display region is set based on a distance from a surface on an observer side in a glass substrate constituting the first display panel on a second display panel side to a surface on an opposite side to the observer side in a glass substrate constituting the second display panel on a first display panel side and a refractive index of each of the glass substrates.

2. The display device according to claim 1, wherein an outer periphery of the image display region of the second display panel is located outside an outer periphery of the image display region of the first display panel in planar view.

3. The display device according to claim 1, further comprising an image processor that generates first image data for displaying a color image in the image display region of the first display panel and second image data for displaying a black-and-white image in the image display region of the second display panel based on an input video signal.

4. The display device according to claim 3, wherein the image processor generates the second image data by generating image data for the opposed display region based on the input video signal and generating image data for the extended display region based on the image data for the opposed display region.

5. The display device according to claim 1, wherein a plurality of pixels arranged in the extended display region overlap a black matrix formed around the image display region of the first display panel in planar view.

6. The display device according to claim 1, wherein the image display region of the second display panel includes an opposed display region facing the image display region of the first display panel in planar view and an extended display region around the opposed display region, and
a part of the plurality of pixels arranged in the extended display region is larger than a pixel arranged in the opposed display region.

7. The display device according to claim 1, wherein second display panel includes a signal line electrically connected to a first output terminal of a drive circuit and branched into a first data line and a second data line, and the first data line is electrically connected to a first pixel column in the opposed display region and the second data line is electrically connected to a second pixel column in the extended display region.

8. The display device according to claim 7, wherein a plurality of another signal lines are electrically connected to a second output terminal of the drive circuit in the extended display region,
the first output terminal is closer to the opposed display region than the second output terminal, and
a number of signal lines electrically connected to the first output terminal is smaller than a number of signal lines electrically connected to the second output terminal.

9. The display device according to claim 7, wherein in the extended display region, the signal for the image display is simultaneously supplied to the plurality of signal lines electrically connected to the first output terminal.

10. The display device according to claim 7, wherein the second pixel column overlaps a black matrix formed around the image display region of the first display panel in planar view.

11. A display device comprising a first display panel and a second display panel disposed farther from an observer than the first display panel,
wherein an image display region of the second display panel is larger than an image display region of the first display panel,
wherein the image display region of the second display panel includes an opposed display region facing the image display region of the first display panel in planar view and an extended display region around the opposed display region,
the second display panel displays an image identical to an image displayed at an end of the opposed display region in the extended display region, and
assuming that t1 is a width of the extended display region, that n1 is a refractive index of a glass substrate constituting the first display panel on a second display panel side, that n2 is a refractive index of a glass substrate constituting the second display panel on a first display panel side, and that d is a distance from a surface on an observer side in the glass substrate constituting the first display panel on the second display panel side to a surface on an opposite side to the observer side in the glass substrate constituting the second display panel on the first display panel side, $$t1 \geq d \times \frac{\sqrt{3}}{\sqrt{4n^2 - 3}}$$

is satisfied, where n=(n1+n2)/2.

12. The display device according to claim 11, wherein an outer periphery of the image display region of the second display panel is located outside an outer periphery of the image display region of the first display panel in planar view.

13. The display device according to claim 11, further comprising an image processor that generates first image data for displaying a color image in the image display region of the first display panel and second image data for displaying a black-and-white image in the image display region of the second display panel based on an input video signal.

14. The display device according to claim 11, wherein a plurality of pixels arranged in the extended display region overlap a black matrix formed around the image display region of the first display panel in planar view.

\* \* \* \* \*